(12) United States Patent
Vishnoi et al.

(10) Patent No.: US 12,348,392 B2
(45) Date of Patent: Jul. 1, 2025

(54) LIGHTWEIGHT CONTAINER NETWORKING SOLUTION FOR RESOURCE CONSTRAINED DEVICES

(71) Applicant: Red Hat, Inc., Raleigh, NC (US)

(72) Inventors: Anil Kumar Vishnoi, Sacramento, CA (US); Brent Salisbury, Frankfort, KY (US)

(73) Assignee: Red Hat, Inc., Raleigh, NC (US)

( * ) Notice: Subject to any disclaimer, the term of this patent is extended or adjusted under 35 U.S.C. 154(b) by 23 days.

(21) Appl. No.: 17/988,690

(22) Filed: Nov. 16, 2022

(65) Prior Publication Data
US 2024/0163184 A1  May 16, 2024

(51) Int. Cl.
*G06F 15/173* (2006.01)
*H04L 43/028* (2022.01)
*H04L 67/60* (2022.01)

(52) U.S. Cl.
CPC ............ *H04L 43/028* (2013.01); *H04L 67/60* (2022.05)

(58) Field of Classification Search
CPC .............................. H04L 43/028; H04L 67/60
USPC ......................................................... 709/223
See application file for complete search history.

(56) References Cited

U.S. PATENT DOCUMENTS

| | | | | |
|---|---|---|---|---|
| 6,301,615 B1 * | 10/2001 | Kutcher | .............. | G06F 11/3495 709/200 |
| 6,963,575 B1 * | 11/2005 | Sistanizadeh | ....... | H04L 12/4625 370/408 |
| 9,860,429 B1 * | 1/2018 | Silverstein | ............. | H04N 25/67 |
| 10,127,091 B1 * | 11/2018 | MacNeil | ................. | G06F 9/545 |
| 2004/0205231 A1 * | 10/2004 | Clarke | .................... | H04L 47/19 709/237 |
| 2005/0030965 A1 * | 2/2005 | Aoki | ..................... | H04L 69/166 370/432 |
| 2005/0117546 A1 * | 6/2005 | Lioy | ................... | H04W 36/144 370/332 |
| 2005/0175016 A1 * | 8/2005 | Kim | ........................ | H04L 69/16 370/395.52 |

(Continued)

FOREIGN PATENT DOCUMENTS

| CN | 111556136 A | 8/2020 |
|---|---|---|
| CN | 114265760 A | 4/2022 |

OTHER PUBLICATIONS

Choochotkaew, et al. "Bypass Container Overlay Networks with Transparent BPF-driven Socket Replacement," 2022 IEEE 15th International Conference on Cloud Computing (CLOUD), Jul. 10-16, 2022, pp. 134-143, doi: 10.1109/CLOUD55607.2022.00033.

(Continued)

*Primary Examiner* — Thuong Nguyen
(74) *Attorney, Agent, or Firm* — Womble Bond Dickinson (US) LLP

(57) ABSTRACT

A networking request is received from a first workload, within a first container, on an edge device. A determination is made that the destination of the networking request is a second workload, within a second container, on the edge device. In response to determining the destination of the networking request, the networking request is forwarded to the second application, wherein the forwarding comprises intercepting the networking request at a socket associated with the first workload and delivering the network request to a socket associated with the second workload.

14 Claims, 13 Drawing Sheets

(56) References Cited

U.S. PATENT DOCUMENTS

| | | | |
|---|---|---|---|
| 2006/0023713 A1* | 2/2006 | Choi | H04L 1/1838 370/252 |
| 2006/0159088 A1* | 7/2006 | Aghvami | H04L 45/306 370/389 |
| 2007/0147320 A1* | 6/2007 | Sattari | H04L 47/829 370/338 |
| 2007/0288619 A1* | 12/2007 | Jun | H04L 67/02 709/223 |
| 2008/0016339 A1* | 1/2008 | Shukla | G06F 21/54 713/164 |
| 2009/0031005 A1* | 1/2009 | Swanson | H04L 67/142 709/218 |
| 2009/0083756 A1* | 3/2009 | Kim | G06F 9/545 719/312 |
| 2010/0198050 A1* | 8/2010 | Mori | A61B 5/055 600/413 |
| 2012/0030687 A1* | 2/2012 | Bhandiwad | G06F 9/545 709/227 |
| 2013/0080650 A1* | 3/2013 | Cherian | H04L 69/162 709/230 |
| 2013/0107887 A1* | 5/2013 | Pearson | H04L 45/04 370/401 |
| 2014/0019572 A1* | 1/2014 | Cardona | H04L 69/161 709/212 |
| 2014/0059206 A1* | 2/2014 | Venkateshwaran | H04L 69/162 709/224 |
| 2014/0068103 A1* | 3/2014 | Gyambavantha | H04L 47/10 709/238 |
| 2014/0095691 A1* | 4/2014 | Ganguli | H04L 41/5009 709/224 |
| 2014/0211807 A1* | 7/2014 | Takenaka | H04L 49/15 370/392 |
| 2014/0333924 A1* | 11/2014 | Martin | G01N 21/031 356/246 |
| 2015/0172153 A1* | 6/2015 | Sharma | H04L 69/162 709/224 |
| 2015/0281047 A1* | 10/2015 | Raju | H04L 49/70 709/244 |
| 2015/0304450 A1* | 10/2015 | van Bemmel | H04L 12/4641 709/217 |
| 2015/0373615 A1* | 12/2015 | Hampel | H04L 45/34 370/329 |
| 2016/0070755 A1* | 3/2016 | Kramer | G06F 9/52 707/760 |
| 2016/0094581 A1* | 3/2016 | Kasbekar | H04L 63/0281 713/151 |
| 2016/0231948 A1* | 8/2016 | Gupta | G06F 3/0688 |
| 2016/0366026 A1* | 12/2016 | Bartfai-Walcott | G06Q 10/06 |
| 2017/0171159 A1* | 6/2017 | Kumar | G06F 9/45558 |
| 2018/0041613 A1* | 2/2018 | Lapidous | H04L 25/14 |
| 2018/0183725 A1* | 6/2018 | Ben-Hagai | H04L 49/3009 |
| 2019/0037391 A1* | 1/2019 | Pignataro | H04L 63/20 |
| 2019/0141571 A1* | 5/2019 | Kim | H04L 69/04 |
| 2019/0207776 A1* | 7/2019 | Wang | H04L 63/0428 |
| 2019/0238509 A1* | 8/2019 | Hira | H04L 63/164 |
| 2020/0252376 A1* | 8/2020 | Feng | H04L 45/74 |
| 2020/0310693 A1* | 10/2020 | Kim | G06F 3/0659 |
| 2021/0344606 A1 | 11/2021 | Taylor et al. | |
| 2021/0352044 A1 | 11/2021 | Asveren et al. | |
| 2022/0129541 A1 | 4/2022 | Scrivano et al. | |
| 2022/0407625 A1* | 12/2022 | Radi | H04L 41/147 |
| 2023/0006898 A1* | 1/2023 | Albrecht | H04L 43/04 |
| 2023/0052452 A1* | 2/2023 | Choochotkaew | H04L 63/1441 |
| 2023/0066013 A1* | 3/2023 | Ball | G06F 21/606 |
| 2023/0127468 A1* | 4/2023 | Kondapavuluru | H04L 63/164 370/392 |
| 2023/0315850 A1* | 10/2023 | Strogov | G06F 21/561 726/24 |

OTHER PUBLICATIONS

Nakamura et al. "Grafting Sockets for Fast Container Networking", In ANCS '18: Symposium on Architectures for Networking and Communications Systems, Jul. 23-24, 2018, Ithaca, NY, USA. ACM, New York, NY, USA, 13 pages. https://doi.org/10.1145/3230718.3230723.

Zavarella, Timothy D. "A methodology for using eBPF to efficiently monitor network behavior in Linux Kubernetes clusters", thesis submitted to the Department of Electrical Engineering and Computer Science, Massachusetts Institute of Technology, May 2022, pp. 1-69.

* cited by examiner

1100

```
┌─────────────────────────────────────┐
│ RECEIVE A NETWORKING REQUEST, FROM A│
│ FIRST WORKLOAD, WITHIN A FIRST      │
│ CONTAINER, ON AN EDGE DEVICE        │
│ 1110                                │
└─────────────────────────────────────┘
                 │
                 ▼
┌─────────────────────────────────────┐
│ DETERMINE THAT A DESTINATION OF THE │
│ NETWORKING REQUEST IS A SECOND      │
│ WORKLOAD, WITHIN A SECOND CONTAINER,│
│ ON THE EDGE DEVICE                  │
│ 1120                                │
└─────────────────────────────────────┘
                 │
                 ▼
┌─────────────────────────────────────┐
│ IN RESPONSE TO THE DETERMINING,     │
│ EVALUATE THE NETWORKING REQUEST     │
│ AGAINST AN ACCESS LIST AND ON A     │
│ CONDITION THAT THE DESTINATION OF THE│
│ NETWORKING REQUEST IS PERMITTED BY THE│
│ ACCESS LIST, FORWARD THE NETWORKING │
│ REQUEST TO THE SECOND WORKLOAD,     │
│ WHEREIN THE FORWARDING COMPRISES    │
│ INTERCEPTING THE NETWORKING REQUEST AT│
│ A SOCKET ASSOCIATED WITH THE FIRST  │
│ WORKLOAD AND DELIVERING IT TO A SOCKET│
│ ASSOCIATED WITH THE SECOND WORKLOAD │
│ 1130                                │
└─────────────────────────────────────┘
```

FIG. 11

```
                    ┌──────────────────────────────────┐
                    │  RECEIVE A NETWORKING REQUEST,   │
                    │  FROM A FIRST WORKLOAD, WITHIN   │
                    │  A FIRST CONTAINER, ON AN EDGE   │
                    │            DEVICE                │
                    │             1210                 │
                    └──────────────────────────────────┘
                                    │
                                    ▼
                    ┌──────────────────────────────────┐
                    │  DETERMINE THAT A DESTINATION    │
                    │  OF THE NETWORKING REQUEST IS A  │
                    │  SECOND WORKLOAD, WITHIN A       │
                    │  SECOND CONTAINER, ON THE EDGE   │
                    │            DEVICE                │
                    │             1220                 │
                    └──────────────────────────────────┘
                                    │
                                    ▼
                    ┌──────────────────────────────────┐
                    │  IN RESPONSE TO THE DETERMINING, │
                    │  EVALUATE THE NETWORKING REQUEST │
                    │  AGAINST AN ACCESS LIST AND ON A │
                    │  CONDITION THAT THE DESTINATION  │
                    │  OF THE NETWORKING REQUEST IS    │
                    │  DENIED BY THE ACCESS LIST,      │
                    │  REJECT THE NETWORKING REQUEST   │
                    │  TO THE SECOND WORKLOAD          │
                    │             1230                 │
                    └──────────────────────────────────┘
```

FIG. 12

LIGHTWEIGHT CONTAINER NETWORKING SOLUTION FOR RESOURCE CONSTRAINED DEVICES

TECHNICAL FIELD

Aspects of the present disclosure relate to secure cloud computing, and more particularly, to reducing networking overhead on edge devices that are deployed in a cloud computing environment.

BACKGROUND

Computing systems may rely on networking stacks to communicate. Cloud computing environments can implement a multi-layer networking stack to provide network communication. Such a networking stack can be implemented as multiple layers of abstraction, from a physical layer to an application layer. A physical layer is responsible for the transmission and reception of unstructured raw data between a device, such as a network interface controller, Ethernet hub, or network switch, and a physical transmission medium, and converts digital bits into electrical, radio, or optical signals. An application layer is used by software applications to provide communication at a programming level, e.g., between a client and server. The encapsulation and decapsulation between these different layers can consume processor, memory, and network bandwidth.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

FIG. 11 is a flow diagram of a method of forwarding a network request, in accordance with some embodiments.

FIG. 12 is a flow diagram of a method of forwarding a network request, in accordance with some embodiments.

DETAILED DESCRIPTION

Figure 1:
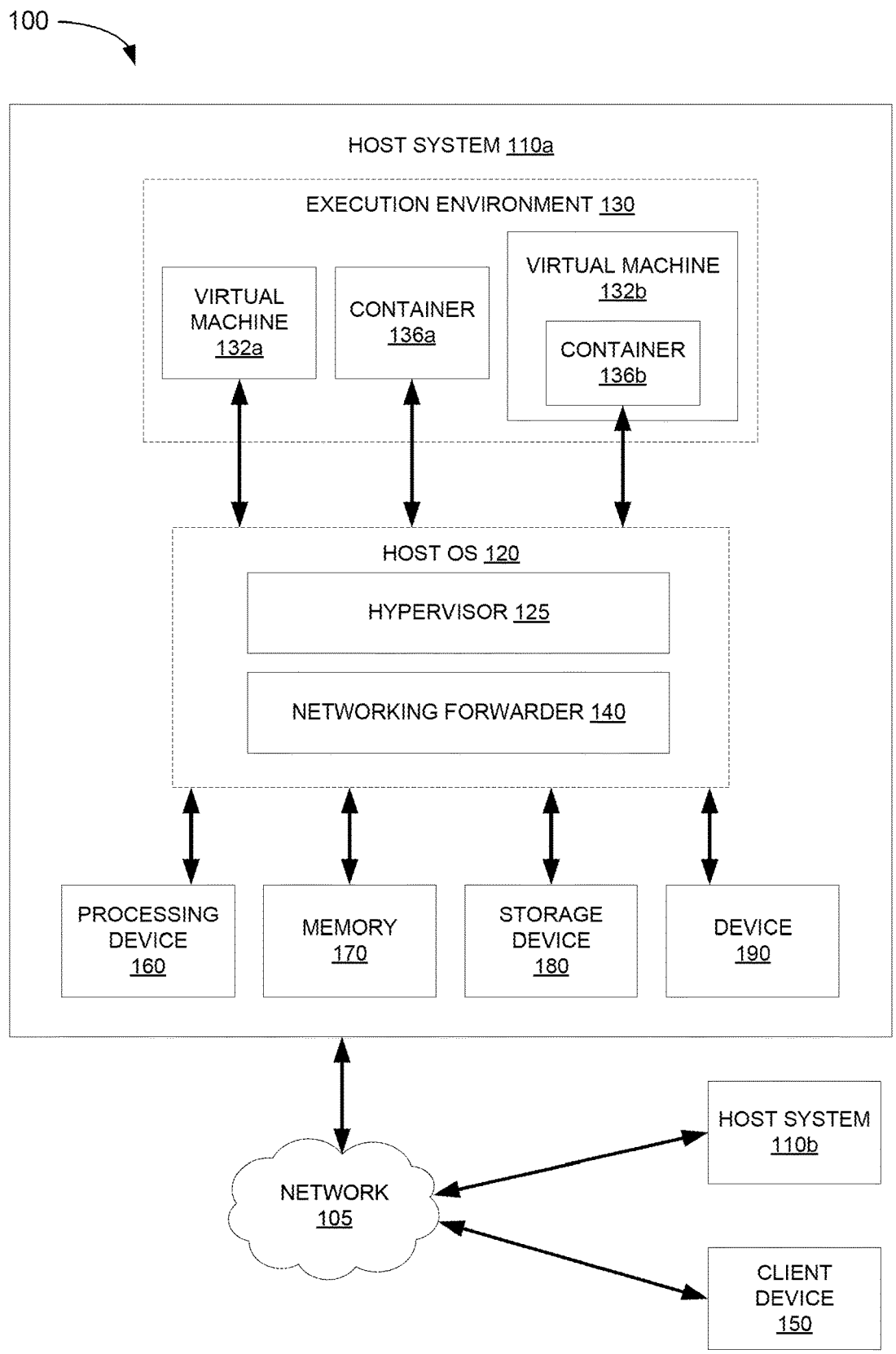
FIG. 1 is a block diagram that illustrates an example network forwarder architecture in accordance with some embodiments.

An edge device can be a piece of hardware that controls data flow at the boundary of a network. Edge devices can fulfill a variety of roles, depending on what type of device they are, but they essentially serve as network entry or exit points. Some common functions of edge devices can be the transmission, routing, processing, monitoring, filtering, translation, and storage of data passing to or from a network. Cloud computing and the "internet of things" (IoT) have elevated the role of edge devices, ushering in the need for more intelligence, computing power and advanced services at the network edge. In the context of IoT, edge devices can encompass a much broader range of device types and functions such as sensors, actuators, and other endpoints. This concept, where processes are decentralized and occur in a more logical physical location, can be referred to as edge computing. Edge computing can involve moving workload closer to the user.

Containers are standard packages of software that bundle an application's code together with related configuration files and libraries, and the dependencies required for the application to run. Such a bundle can be termed a workflow, and can allow organizations to deploy applications seamlessly and more efficiently across environments. Workflows incorporated into containers can allow agility, portability, and rapid scalability. These solutions can be very large scale, e.g., planet-scale, in which large numbers of containers are running a large number of workloads in a data center.

However, using containers within edge devices can be challenging. In particular, many edge devices have limited compute resources, e.g., CPU and memory, and system overhead can impact the computing resources available to execute an application workload deployed on the device. A container's networking stack can be a significant consumer of a device's compute resources. As networking traffic increases, it can consume a greater amount of compute resources, eventually competing with workloads for compute resources within the edge device. Many container orchestrator networking solutions incur a significant compute cost because their architectures support dynamic, planetary-scale networking. By contrast, edge devices tend to be isolated devices running a workload with minimal cross device communication. Consequently, the functional requirements for networking solutions are significantly reduced. For example, most edge devices run on a single subnet, so all the containers are in the same broadcast domain. The number of containers running on these devices are small, e.g., 5 to 250. Most of the traffic on an edge device is between the containers within the device, with the remaining traffic mostly to/from the internet, e.g., a cloud site managing these edge devices, and insignificant compared to typical applications deployed in the cloud.

Rather than using a full-featured networking stack on an edge device, a simpler networking solution can be provided that reduces the compute overhead of the edge device. Such a solution, a lightweight container networking solution, can leverage the reduced functional requirements of edge devices to consume fewer compute resources, simplify the control plane and data plane functions, provide better packet forwarding latency, and avoid requiring installation of any additional software, further providing a low storage/disk space footprint. Furthermore, such a solution can recognize "data gravity," by moving compute, storage, and networking resources closer to the data to be processed.

As discussed in greater detail below, a networking forwarder system may receive a networking request from a first workload, within a first container, on an edge device, to send data to a workflow running in another container on the edge device. The networking forwarder system may determine that a destination of the networking request is a second workload, within a second container, on the edge device. In response to that determination, the networking forwarder system can forward the networking request to the second workload in a manner that avoids much of the overhead of a traditional networking stack.

Aspects of the present disclosure address the above-noted and other deficiencies of current container networking solutions by presenting methods and systems for using a lightweight networking packet filter that can intercept networking packets at multiple levels in the operating system network stack.

Although aspects of the disclosure may be described in the context of a networking forwarder architecture, embodiments of the disclosure may be applied to any computing system that provides networking capabilities.

FIG. 1 is a block diagram that illustrates an example network forwarder architecture, in accordance with some embodiments. However, other network forwarder architectures 100 are possible, and the implementation of a computer system utilizing examples of the disclosure are not necessarily limited to the specific architecture depicted by FIG. 1.

As shown in FIG. 1, network forwarder architecture 100 includes host systems 110a and 110b, network forwarder system 140, and client device 150. The host systems 110a and 110b, network forwarder system 140, and client device 150 include one or more processing devices 160, memory 170, which may include volatile memory devices, e.g., random access memory (RAM), non-volatile memory devices, e.g., flash memory, and/or other types of memory devices, a storage device 180, e.g., one or more magnetic hard disk drives, a Peripheral Component Interconnect (PCI) solid state drive, a Redundant Array of Independent Disks (RAID) system, or a network attached storage (NAS) array, and one or more devices 190, e.g., a Peripheral Component Interconnect (PCI) device, a network interface controller (NIC), a video card, or an I/O device. In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments of host systems 110a and 110b, network forwarder system 140, and client device 150 may include multiple processing devices, storage devices, or devices. Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like.

The host systems 110a and 110b, network forwarder system 140, and client device 150 may be a server, a mainframe, a workstation, a personal computer (PC), a mobile phone, a palm-sized computing device, etc. In some embodiments, host systems 110a and 110b, network forwarder system 140, and/or client device 150 may be separate computing devices. In some embodiments, host systems 110a and 110b, network forwarder system 140, and/or client device 150 may be implemented by a single computing device. For clarity, some components of network forwarder system 140, host system 110b, and client device 150 are not shown. In some embodiments, the network forwarder system 140 may be part of a container-orchestration system. Furthermore, although network forwarder architecture 100 is illustrated as having two host systems, embodiments of the disclosure may utilize any number of host systems.

Host systems 110a and 110b may additionally include execution environments 130, which may include one or more virtual machines (VMs) 132a, containers 136a, containers 136b residing within virtual machines 132b, and a host operating system (OS) 120. VM 132a and VM 132b are software implementations of machines that execute programs as though they were actual physical machines. Containers 136a and 136b act as isolated execution environments for different workloads of services, as previously described. Host OS 120 manages the hardware resources of the computer system and provides functions such as inter-process communication, scheduling, memory management, and so forth.

Host OS 120 may include a hypervisor 125, which may also be known as a virtual machine monitor (VMM), that can provide a virtual operating platform for VMs 132a and 132b and manage their execution. Hypervisor 125 may manage system resources, including access to physical processing devices, e.g., processors or CPUs, physical memory, e.g., RAM, storage devices, e.g., HDDs or SSDs, and/or other devices, e.g., sound cards or video cards. The hypervisor 125, though typically implemented in software, may emulate and export a bare machine interface to higher level software in the form of virtual processors and guest memory. Higher level software may comprise a standard or real-time OS, may be a highly stripped-down operating environment with limited operating system functionality, and/or may not include traditional OS facilities, etc. Hypervisor 125 may present other software, i.e., "guest" software, the abstraction of one or more VMs that provide the same or different abstractions to various guest software, e.g., a guest operating system or guest applications. It should be noted that in some alternative implementations, hypervisor 125 may be external to host OS 120, rather than embedded within host OS 120, or may replace host OS 120.

The host systems 110a and 110b, network forwarder system 140, and client device 150 are coupled to each other, e.g., may be operatively coupled, communicatively coupled, or may send data/messages to each other, via network 105. Network 105 may be a public network, e.g., the internet, a private network, e.g., a local area network (LAN) or a wide area network (WAN), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers, e.g., cell towers. The network 105 may carry communications, e.g., data, message, packets, or frames, between the various components of host systems 110a and 110b, network forwarder system 140, and/or client device 150.

In some embodiments, host system 110a may support a networking forwarder 140. The networking forwarder 140 may receive a request from an application executing in container 136a to send a message to an application executing in container 136b. The networking forwarder 140 may identify communication endpoints for execution environment(s) to support communication with host system 110a and/or host system 110b. The networking forwarder 140 may configure the network connections to facilitate communication between the execution environment(s) and/or the client device 150. Further details regarding networking forwarder 140 will be discussed as part of the description of FIGS. 2-13 below.

TCP, and IP, in the context of TCP/IP, are abbreviations for Transmission Control Protocol, which runs on top of, Internet Protocol. They are part of a set of protocols that define how two or more computers can communicate with each other. A protocol can be thought of as a set of rules that describe how data, in the form of messages, are passed between computers. TCP/IP is an open standard that can be implemented on any computer with the appropriate physical attributes. The TCP/IP protocol family comprises many derivative protocols. These protocols provide functionality important to the exchange of data over the networks. These protocols can be integral to networking, e.g., the Domain Name System (DNS), or can support an application that uses the network, e.g., email.

A related protocol is User Datagram Protocol, or UDP which also runs on top of IP. TCP differs from UDP in that TCP is a connection-based protocol whereas UDP is connectionless. In other words, TCP establishes a session between applications on respective hosts, which allows the applications to acknowledge successful receipt of messages in their intended sequence. With UDP, there is no confirmation that transmitted messages, containing data packets, were actually received, nor does the protocol support retry. An application can run on top of UDP and programmatically implement acknowledgement and/or retry, but that can be distinguished from using the provided capabilities of a networking stack.

TCP can be analogized to the telephone system and UDP to the post office. Upon establishment of a telephone connection with another person, one can confirm that a message is conveyed and received. If the call fails mid-conversation, both participants are aware and can reestablish the call. By contrast, after (standard) posting of a letter there is no confirmation of its delivery or other disposition. However, the use of TCP involves overhead, which can consume computer (processor and memory) resources.

The TCP/IP protocol can be described and analogized to the Open Standards Institute (OSI) model. The OSI model comprises seven layers: application; presentation; session; transport; network; data link; and physical. The physical layer describes the media over which the data travels, such as the voltage of an electrical signal across a copper wire or a light pulse across a fiber optics cable. The data link layer describes the means by which digital bits are carried across the physical layer. For example, indicating the start and end of a data stream. Support for the physical layer and the data link layer are often provided by networking hardware.

The network layer supports the routing of data through a network, e.g., routing messages between two computers using the Internet address of the computers. The IP protocol is an example of a network layer protocol. The transport and session layers provide end-to-end session integrity, possibly including "keep-alives" to maintain a connection over long periods of time. TCP and UDP represent examples of transport/session layer protocols that run on top of the network layer protocol, IP.

Application and presentation layers provide an interface to application. Often this interface is in the form of application libraries that application code can call in order to implement inter-computer communications. One application layer available to TCP/IP is the socket. A socket programming interface provides the routines required for interprocess communication between applications, either on a local system or a distributed, TCP/IP-based network environment. Once a peer-to-peer connection is established, a socket descriptor is used to uniquely identify the connection.

An important part of all networking protocols is their addressing scheme. Without being able to locate individual machines (or hosts), or execution environments on those hosts, it is difficult for any communication to take place between them. IP provides addressing for each end of the connection.

An address used by IP can consist of four octets and can be 32 bits long. The address is stored in a format known as dotted decimal, e.g., xxx.xxx.xxx.xxx, where xxx is a number between 0 and 255. An example of an IP address is: 192.168.3.27. IP version 4, or IPv4, is currently the main addressing schemed used on the Internet. IP version 6, or IPv6, replaces the 32-bit addressing scheme with a 128-bit addressing scheme, providing support for additional computers, and in particular, edge devices. IPv6 addresses are written in eight groups of four hexadecimal digits with each group separated by a colon, e.g., 2176:03df:1311:21da: 0000:0000:33ad:0136.

Most users however do not need to use an IP address. Instead, a host computer or execution environment can usually be referred to by its host name. The IP address for that host can then be obtained, e.g., by using the Domain Name System (DNS). DNS relies on a curated directory that maps IP addresses to computer names. A request to DNS including a hostname, e.g., "redhat.com," will return a current IP address.

While an IP address can provide a path to the correct machine, the address alone cannot distinguish among the different services available on that machine. A construct called a "port" can be used to distinguish among applications available on a host or execution environment. Ports can have a value from 0 to 65535, and the combination of IP address, port, and protocol is called a socket. A socket is a unique value for every service or application offered on a host or execution environment. Port numbers are supported for both TCP and UDP, and when referred to in conjunction with an IP address, can be used to obtain a socket. A socket can be programmatically accessed, through the use of a library, by application code, providing networking capability for an application program.

Figure 2:
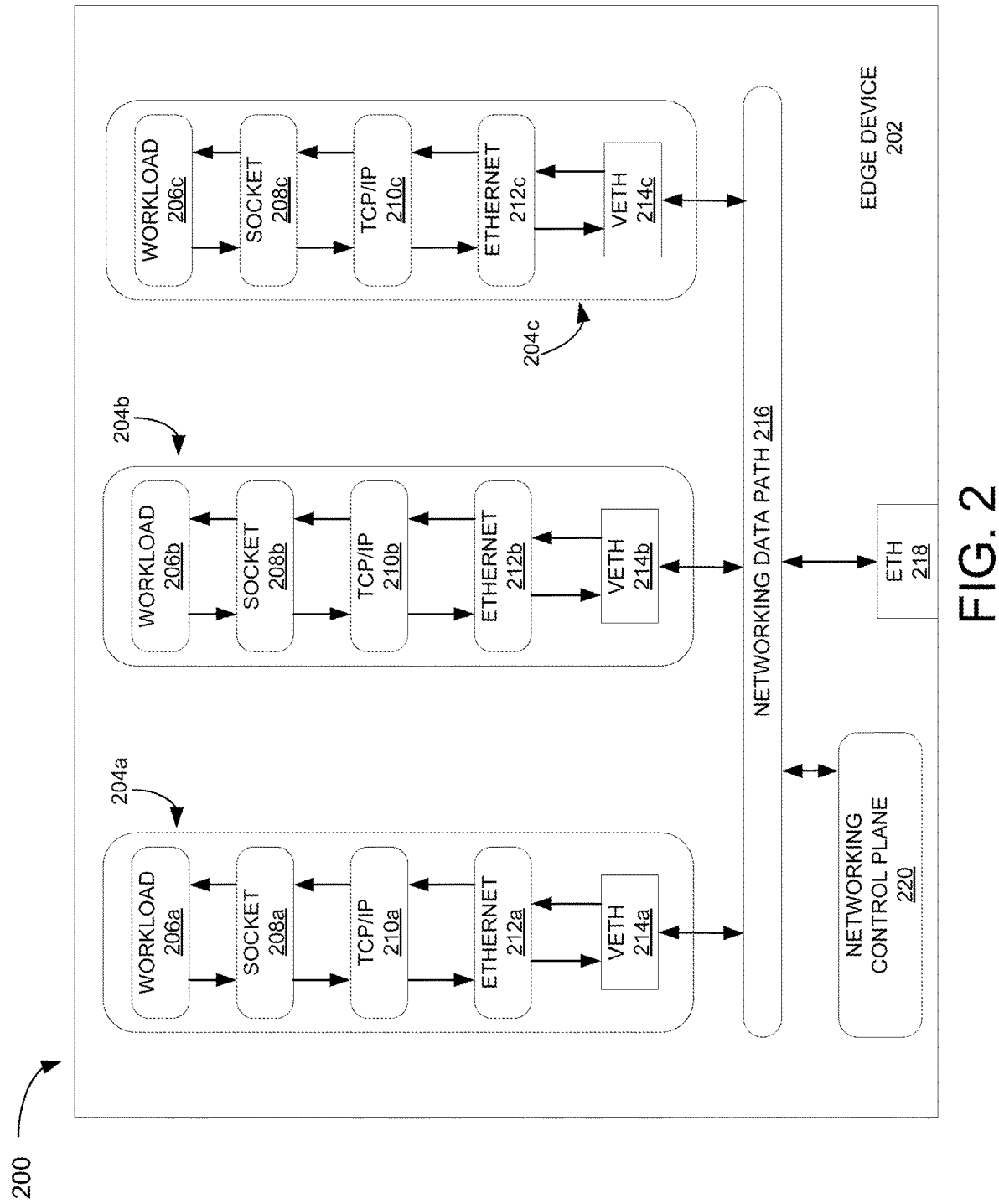
FIG. 2 is a block diagram of an example execution environment of an edge device that contains a traditional networking stack, in accordance with some embodiments of the disclosure.

FIG. 2 is a block diagram of an example execution environment 200 of an edge device 202 that contains a traditional networking stack, in accordance with some embodiments of the disclosure. FIG. 2 includes containers 204a, 204b, and 204c. Containers 204a, 204b, and 204c may correspond to execution environment 130 of FIG. 1. Container 204a supports the TCP/IP protocol, and provides a socket interface 208a to the networking stack, which contains a TCP/IP interface 210a. Container 204a also supports an ethernet interface 212a and a virtual ethernet interface 214a. A virtual ethernet interface (VETH) can masquerade as a physical ethernet interface to allow an execution environment to coordinate with operating system software, which may expect to talk to a hardware ethernet network interface controller, or NIC. The virtual ethernet interface 214a connects to a networking data path 216, which provides connectivity to other execution environments 204b and 204c, as well as ethernet adaptor 218, which can provide connectivity to other hosts. Network parameters, which include those of the individual execution environments and those of the host itself, can be managed by the networking control plane 220. Containers 204b and 204c contain similar networking stacks with socket interfaces 208b and 208c, TCP/IP interfaces 210b and 210c, ethernet interfaces 212b and 212c, and virtual ethernet interfaces 214b and 214c. Containers 204b and 204c are also connected to the networking data path 216 and their networking parameters controlled by networking control plane 220.

When data moves from an upper layer to a lower layer of the TCP/IP protocol stack, during an outgoing transmission, each layer includes a bundle of relevant information called a "header" along with the actual data. The data package containing the header and the message (data) from the upper layer in turn becomes the data that is repackaged at the next lower level with that lower layer's header. The header is supplemental data placed at the beginning of a block of data when it is transmitted. This supplemental data is used at the receiving side to extract the data from the encapsulated data packet. This packing of data at each layer is known as data encapsulation. In some embodiments, a data package is termed a message.

The reverse process of decapsulation occurs when data is received by a destination host. As the data moves up from a lower layer to an upper layer of the TCP/IP protocol stack, each layer unpacks the corresponding header and uses the information contained in that header to deliver the packet to the next layer of the protocol.

Referring to FIG. 2, container 204a contains a workload 206a, which uses a network stack provided by the container 204a, and takes advantage of a socket 208a interface to send network messages. In some embodiments, the socket layer corresponds to the application layer of a networking abstraction model. A network message is encapsulated by the socket layer into one or more TCP/IP messages, or packets, and passed to a TCP/IP 210a interface. The TCP/IP 210a interface encapsulates the one or more TCP/IP packets and passes them to an ethernet interface 212a. In some embodiments, the ethernet interface 212a can modify or encapsulate the ethernet packets and deliver them to the virtual ethernet interface 214a. In some embodiments, under the control of the networking control plane, the ethernet packets, and their destination information, are sent over the networking data path 216 to another workload, 206b or 206c, in a respective container, 204b or 204c. In some embodiments, the packets are sent, by way of ethernet interface 218, to another host.

Upon receipt by a virtual ethernet interface, 214b or 214c, the data packet is decapsulated, and the resulting ethernet packet is provided to the ethernet interface 214b or 214c. The ethernet interface, in turn, decapsulates its input, and provides a TCP/IP packet to the TCP/IP interface 210b or 210c. The TCP interface decapsulates its input, and provides a data packet to the socket interface 208b or 208c. The socket interface then routes and delivers the data packet to the appropriate workload 206b or 206c. In some embodiments, the data packet may be received by a host outside the edge device 202, which will decapsulate the packet as it traverses a networking stack and deliver the data packet to a workload on that host.

Encapsulation and decapsulation, while elegant from a logic perspective, can have a material cost in processor, memory, and network bandwidth. First, the addition of headers to a networking message increases the size of the message that needs to be sent over the network. As the size of a message increases, the time to transmit the message can increase. Similarly, larger messages can lead to congestion in a network. Second, the networking message will need to be buffered in memory and the addition of headers will increase the amount of memory needed for buffering. As a volume of network messages increases, the amount of memory used to buffer those messages will increase. Third, encapsulation and decapsulation require attention from a host's processor to perform the steps of packing and unpacking the layers of messages and processing each layer's headers.

Using containers to deploy workloads on edge devices is a new reality. Generally, most edge devices have limited compute resources, e.g., CPU and memory, and users would prefer to devote the maximum compute resources towards the execution of a workload deployed on the device rather than on networking overhead. A container's networking stack can be one of the major contenders for a device's compute resources. In some embodiments, as the network packet traffic increases, it will consume more compute resources, and may contend with workloads for compute resources. Minimizing a compute cost of networking can leave more compute resources available for workload execution.

Many large-scale container orchestrator networking solutions, e.g., Kubernetes Container Network Interface (CNI), have a significant compute cost, because their architecture supports planetary-scale deployments and accommodates very dynamic conditions. These networking solutions provide networking within multiple compute nodes as well as a single compute node, which can make these solutions complex and compute intensive. By contrast, edge devices are typically isolated devices running a workload not requiring significant cross device communication. In many embodiments, edge devices can have significantly reduced functional networking requirements. Large-scale container orchestrator CNI's for edge devices can also incur additional, unnecessary, costs, due to their complex control plane, on critical compute resources of the edge device that would otherwise be used to deploy more workload on the device.

Existing container networking solutions require a packet from a workload, e.g., 206a, running within a container, e.g., 204a, to traverse a socket layer, e.g., 208a, a TCP/IP layer, e.g., 210a, and an ethernet layer, e.g., 212a. The packet is then injected in the networking data path 216 running at the host, or node, level, which forwards the traffic to the destination workload container, e.g., execution environment 204b. At the destination workload container, e.g., 204b, the packet needs to travel through the networking layers, e.g., 214b, 212b, 210b, and 208b again, this time in reverse. This approach incurs the cost of encapsulating and decapsulating the packet at each networking layer (socket, IP, ethernet), when the packet doesn't need to leave the edge device. This double traversal through the networking layers can be costly when it comes to edge devices with limited compute resources.

The networking stack of a computer is usually part of its operating system, and access to the stack is achieved through a system call. A system call is a procedure that provides the interface between a process and the operating system. It is the way by which a computer program requests a service from the kernel of the operating system. Different operating systems provide different system calls. In some operating systems, e.g., Linux, making a system call involves transferring control from unprivileged user mode to privileged kernel mode; the details of this transfer vary from architecture to architecture. The libraries take care of collecting the system-call arguments and, if necessary, arranging those arguments in the special form necessary to make the system call.

In user mode (or user space) the abstraction of network communication is the socket. The socket abstracts a communication channel and is the kernel-based TCP/IP stack interaction interface. An IP socket is associated with an IP address, the transport layer protocol used (TCP, UDP, etc.) and a port. In some embodiments, an outgoing message begins with an application system call to write data to a socket. The send function verifies the status of the socket, examines its protocol type, and sends the data on to the transport layer routine (such as TCP or UDP). This protocol creates a new buffer for the outgoing packet (a socket buffer), copies the data from the application buffer, and fills in its header information (such as port number, options, and checksum) before passing the new buffer to the network layer (usually IP). The IP layer function fills in more of the buffer with its own protocol headers (such as the IP address, options, and checksum). It may also fragment the packet if required. Next the IP layer passes the packet to the link layer function, which moves the packet onto the sending device's xmit queue and makes sure the device knows that it has traffic to send. Finally, the device (such as a network card) tells the bus to send the packet.

The buffer comprises a payload of the networking call. The payload, or message, also called a data package, constitutes the "what" of the networking system call. Similarly, "who" can include the source and destinations; "how" can specify a particular protocol, e.g., TCP or UDP; "where" can constitute a socket. In some embodiments, the payload is a collection of bytes. In some embodiments, the payload is the address, or a pointer to, the collection of bytes. The protocol headers contain information that supports, for example, routing packets from a source address to a destination address and delivering it to the proper application. The payload, however, is the message content that the source desires the destination receive and consume.

However, in some embodiments, "hooks" can be inserted within the operating system (kernel) networking stack. A hook is a means of executing custom code (function) either before, after, or instead of existing code. For example, using a packet filter like the extended Berkeley packet filter (eBPF), much of the networking stack can be bypassed. In some embodiments, a hook can be created to intercept a packet originating at a particular socket, and directly forward it to another socket. In some embodiments, a hook can be a sandboxed hook, in which case the hook runs within a "sandbox," a controlled, restricted environment isolated from other applications and workflows. By limiting the environment in which code can execute, developers can protect the application or workflow from outside influences, whether these are system resources or non-malicious bugs, or malicious malware or hackers. In some embodiments, the sockets can be on different containers. This can be referred to as socket redirection. The locations of both sockets can be recorded in a map containing network addresses, workflows, and sockets. A container orchestrator can manage this information, and as the orchestrator provisions an edge device, it can record the information associated with the included containers and workflows. In some embodiments, this can allow an application to avoid incurring the overhead of a networking, e.g., TCP/IP, stack, and effectively connect two applications, over sockets on two different containers.

Figure 3:
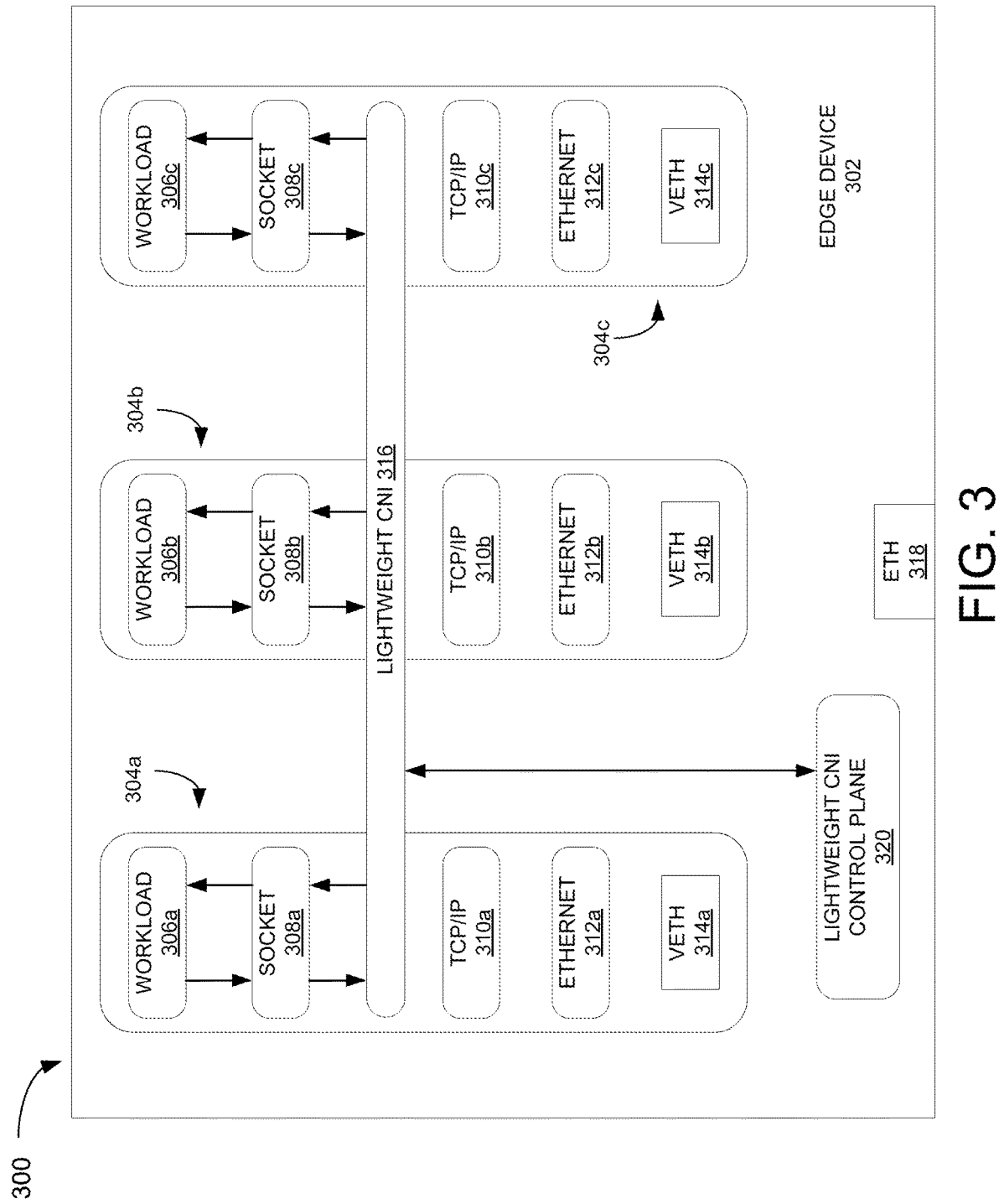
FIG. 3 is block diagram of an example execution environment of an edge device that contains a lightweight networking stack, in accordance with some embodiments of the disclosure.

FIG. 3 is a block diagram of an example execution environment 300 of an edge device 302 that contains a lightweight networking stack, in accordance with some embodiments of the disclosure. Execution environment 300 may correspond to execution environment 130 of FIG. 1. Containers 304a, 304b, and 304c may correspond to containers 136a, 136b, and 136c of FIG. 1. Container 304a supports the TCP/IP protocol, and provides a socket interface 308a to the networking stack, which contains a TCP/IP interface 310a. Container 304a also supports an ethernet interface 312a and a virtual ethernet interface 314a. A lightweight CNI 316 is exposed to the containers 304a, 304b, and 304c, providing connectivity between the containers. In some embodiments, the lightweight CNI 316 is an eBPF CNI. The virtual ethernet interfaces 214a, 214b, and 214c can communicate with ethernet adaptor 218, which can provide connectivity to hosts outside the execution environment 300. In some embodiments, network parameters for the containers can be managed by the lightweight CNI control plane 320. Containers 304b and 304c contain similar networking stacks with socket interfaces 308b and 308c, TCP/IP interfaces 310b and 310c, ethernet interfaces 312b and 312c, and virtual ethernet interfaces 314b and 314c.

Referring to FIG. 3, container 304a contains a workload 306a, which uses a network stack provided by the container 304a, and takes advantage of a socket 308a interface to send and receive network messages. In some embodiments, the socket layer corresponds to the application layer of a networking abstraction model. However, rather than traversing the entire TCP/IP networking stack, the packets are intercepted at the socket interface 308a. In some embodiments, under the control of the lightweight CNI control plane 320, the workload packets are sent over the lightweight CNI data path 316 to the socket address of another workload, 306b or 306c, in respective containers 304b or 304c. Forwarding rules for containers and workloads within the edge device can be managed through an access list. In some embodiments, packets intended for delivery outside the execution environment 300 are routed through the regular TCP/IP network stack and sent by way of ethernet interface 318, to another host. Forwarding rules to handle these packets can be configured in the regular TCP/IP network stack.

Upon receipt by a socket in the destination workload, the packet is consumed. In some embodiments, the processor, memory, and network bandwidth overheads of traversing the network stack are avoided, leaving more compute resources available to the respective workloads. In some embodiments, the data packet may be received by a host outside the edge device 202, which will decapsulate the packet as it traverses a networking stack and deliver the data packet to a workload on that host.

Figure 4:
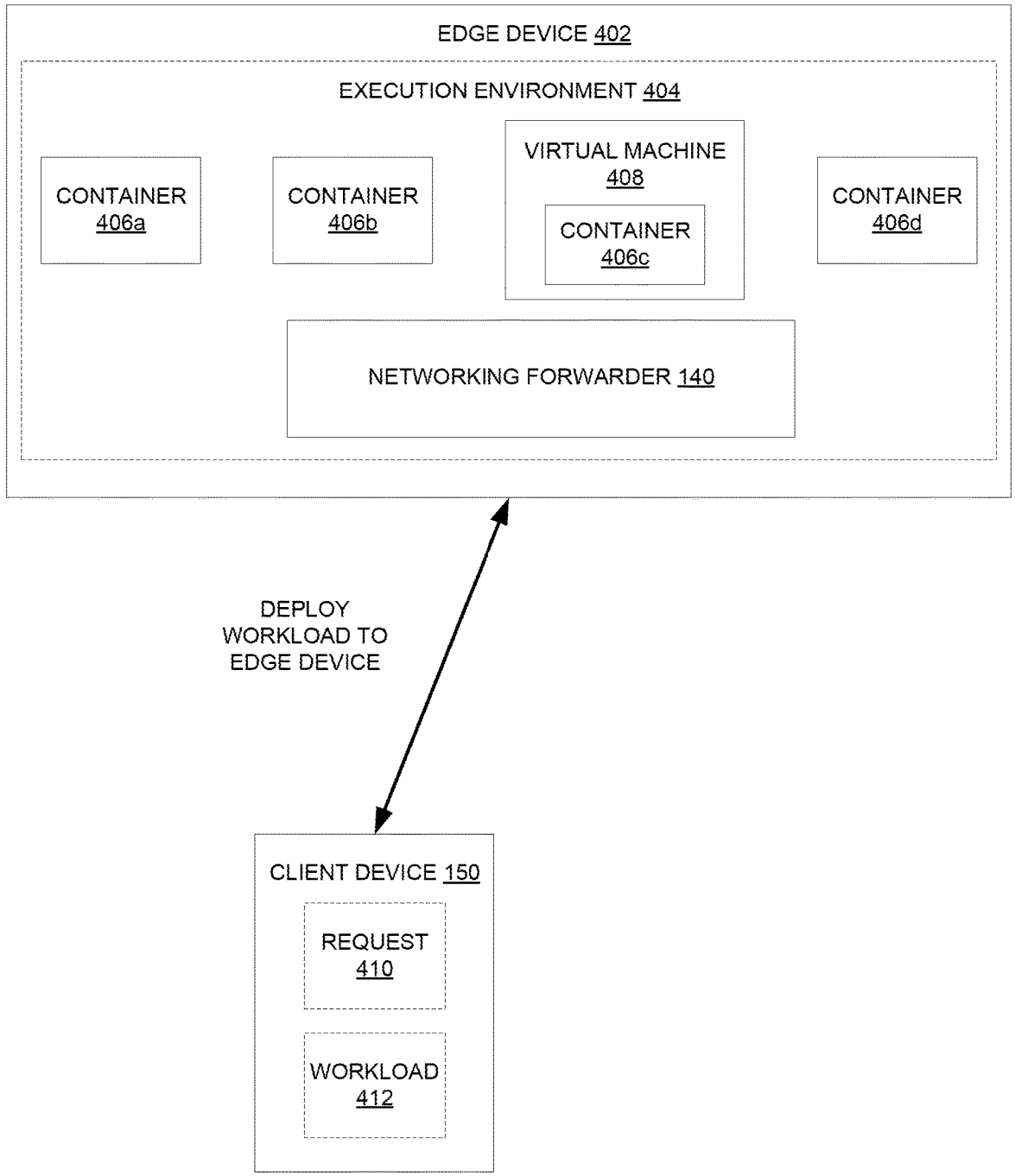
FIG. 4 is an illustration of an example of a client device transmitting a request to deploy a workload to an edge device of a network forwarder architecture, in accordance with some embodiments of the disclosure.

FIG. 4 is an illustration of an example of a client device transmitting a request to deploy a workload to an edge device 402 of a network forwarder architecture 400, in accordance with some embodiments of the disclosure. Network forwarder architecture 400 may correspond to network forwarder architecture 100, as previously described at FIG. 1. For clarity, some elements of the network forwarder architecture 100 are not shown.

Referring to FIG. 4, client device 150 includes a workload 412 that is to be deployed to one or more execution environments 404 with containers 406*a-d*, that are supported by an edge device 402 of the network forwarder architecture 400. Container 406*c* executes within a virtual machine 408. Upon identifying the workload 412 that is to be deployed, the client device 150 may generate a request 410 that includes identification information for the containers 406*a-d* that are to execute workload 412. In some embodiments, the client device 150 may determine the identification information in view of the workload 412 that is to be deployed. For example, workload 412 may be associated with an application executed by client device 150 and the application may indicate particular execution environments 404 that are to be used to execute workload 412. In some embodiments, the client device 150 may utilize other criteria to determine the identification information for the one or more execution environments 404. It should be noted that request 410 and workload 412 are shown for illustrative purposes only and are not physical components of client device 150.

In FIG. 4, the request 410 includes identification information for containers 306*a-d*, indicating that containers 306*a-d* are to be used to execute workload 412. Upon generating the request 410, the client device 150 may transmit the request 410, including the identification information, to the networking forwarder system 140. The networking forwarder system 140 may use the identification information included in the request 410 to create socket endpoints for workloads in containers 306*a-d* that are indicated in the request 410. As previously described, the socket endpoints may provide connectivity for the workloads executing within the containers. In some embodiments, the socket endpoints may correspond to addresses, e.g., IP addresses, media access control (MAC) addresses, or uniform resource locator (URL) addresses of the containers and their respective workloads.

Figure 5:
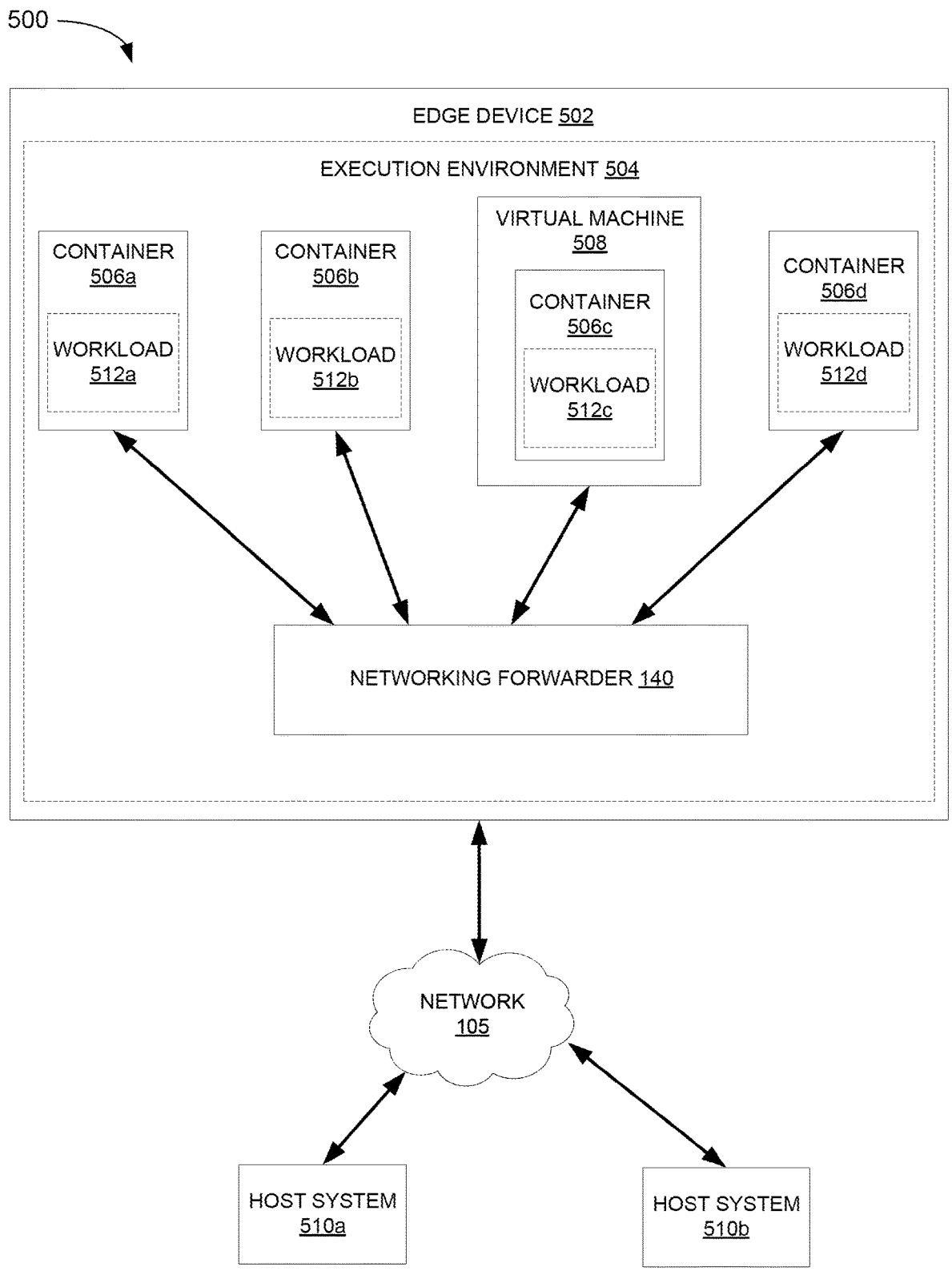
FIG. 5 is an illustration of an example execution environment within an edge device with a networking forwarder transmitting a networking request from a first workload executing in a first container to a second workload executing in a second container, in accordance with embodiments of the disclosure.

FIG. 5 is an illustration of an example execution environment 500 within an edge device 502 with a networking forwarder 140 transmitting a networking request from a first workload executing in a first container to a second workload executing in a second container, in accordance with embodiments of the disclosure. Networking forwarder architecture 500 may correspond to networking forwarder architecture 100, as previously described at FIG. 1. For clarity, some elements of the networking forwarder architecture 100 are not shown.

Referring to FIG. 5, containers 506*a-d* include workloads 512*a-d*, respectively, that are to be executed by execution environment 504 of edge device 502 of the network forwarder architecture 500. Container 506*c* executes within a virtual machine 508. Upon detection of a networking request from a workload 512*a* executing within container 506*a*, networking forwarder inspects the destination address of the networking request. If the container is co-resident on the edge device 502, it can be directly routed to the socket associated with the destination address and bypass the lower TCP/IP layers. If the destination address is external to the edge device, programming logic of the network forwarder 140 can cause the networking request to use the regular TCP/IP network stack. It should be noted that containers 506*a-d*, workloads 512*a-d*, virtual machine 508, execution environment 504, and networking forwarder 140 are shown for illustrative purposes only and are not physical components of edge device 502.

Upon receiving a networking request from a first workload, e.g., workload 512*a*, executing in a first container, e.g., container 506*a*, directed to a second workload, e.g., workload 512*d*, executing in a second container, e.g., container 506*d*, that is co-resident on the edge device, the networking forwarder can intercept the networking request at the socket layer, determine the socket address of the second workload, and route the request to the second workload by way of the socket address. In some embodiments, the networking forwarder 140 may utilize other criteria to determine the destination socket for the second workload. It should be noted that execution environment 504, containers 506*a-d*, virtual machine 508, and workloads 512*a-d* are shown for illustrative purposes only and are not physical components of edge device 502.

In some embodiments, in the event that the destination of the networking request is external to the edge device 502, processing logic in the execution environment may cause the networking forwarder 140 to be bypassed, allowing the networking request to travel over the network 105 to a host system 510*a* or 510*b*. In some embodiments, in the event that the destination of the networking request is external to the edge device 502, processing logic in the containers 506*a-d* may cause the networking forwarder 140 to be bypassed, allowing the networking request to travel over the network 105 to a host system 510*a* or 510*b*. In some embodiments, in the event that the destination of the networking request is external to the edge device 502, processing logic in the network forwarder 140 may cause the networking forwarder 140 to send the networking request over the network 105 to a host system 510*a* or 510*b*. In some embodiments, network 105 may be similar to network 105 of FIG. 1. In some embodiments host systems 510*a* and 510*b* may be similar to host system 110*a* of FIG. 1.

In some embodiments, network forwarding can be controlled through the use of an access list. Such an access list can implement network policy on the edge device and serve as a private firewall within an edge device, limiting or restricting socket-to-socket network traffic between workflows in containers. In some embodiments, access can be managed at an aggregate level, allowing groups of workflows to communicate with other groups of workflows via socket-to-socket networking. In some embodiments, particular containers can be restricted from communicating with other containers using socket redirection.

Figure 6:
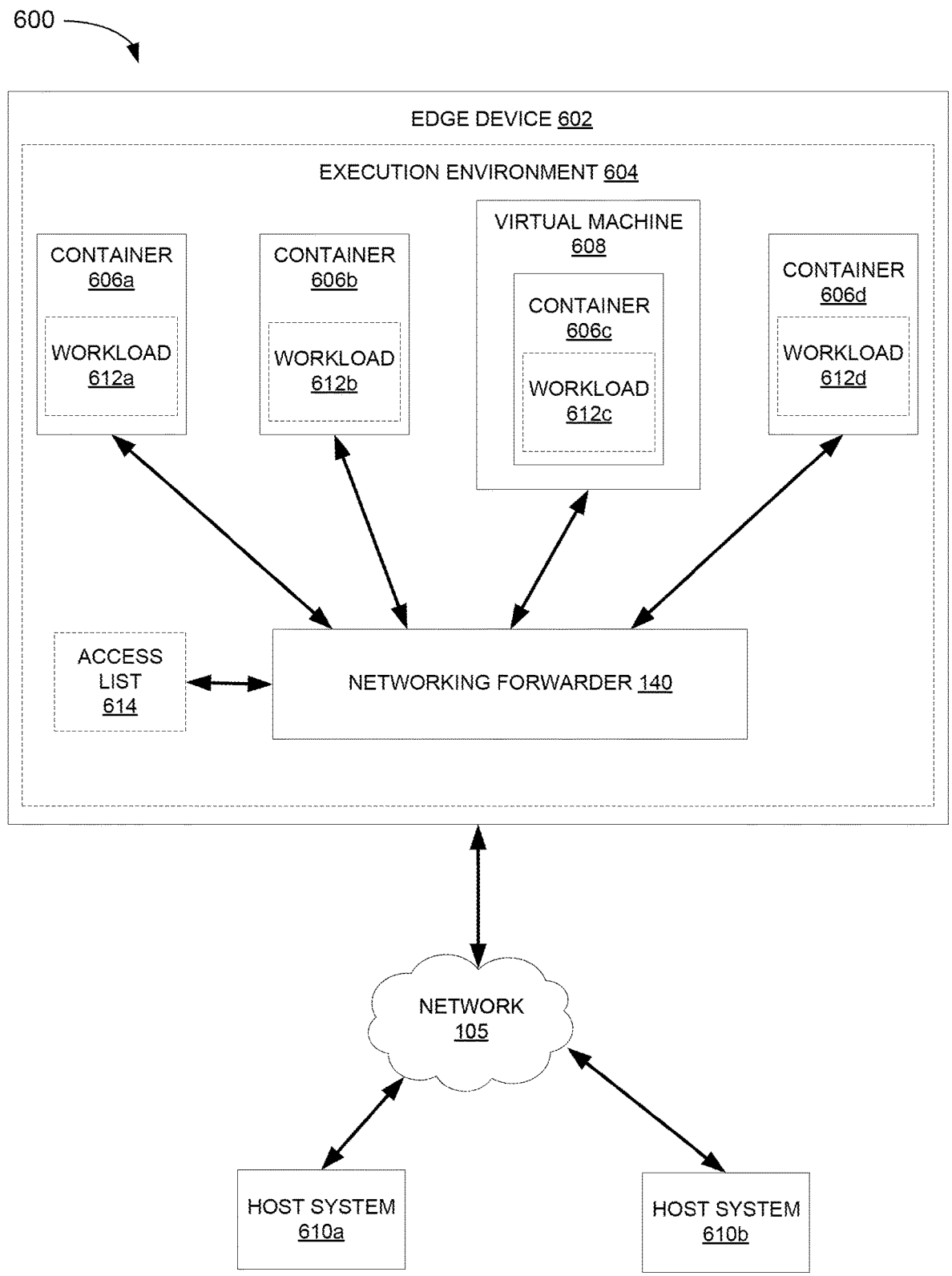
FIG. 6 is an illustration of an example execution environment within an edge device, with a first container transmitting a networking request to another workload within a second container, in accordance with some embodiments of the disclosure.

FIG. 6 is an illustration of an example execution environment 600 within an edge device 602, with a first container transmitting a networking request to another workload within a second container, in accordance with some embodiments of the disclosure. In the example, the networking forwarder 140 uses an access list 614 to allow forwarding. Networking forwarder architecture 600 may correspond to networking forwarder architecture 100, as previously described at FIG. 1. For clarity, some elements of the networking forwarder architecture 100 are not shown.

Referring to FIG. 6, containers 606*a-d* include workloads 612*a-d*, respectively, that are to be executed by execution environment 604 of edge device 602 of the network forwarder architecture 600. Container 606*c* executes within a virtual machine 608. Upon detection of a networking request from a workload 612*a* executing within container 606*a*, networking forwarder inspects the destination address of the networking request. If the container is co-resident on the edge device 602, it can be directly routed to the socket associated with the destination address and bypass the lower TCP/IP layers. If the destination address is external to the edge device, programming logic of the network forwarder 140 can cause the networking request to use the regular TCP/IP network stack. It should be noted that containers 606a-d, workloads 612a-d, virtual machine 608, execution environment 604, and networking forwarder 140 are shown for illustrative purposes only and are not physical components of edge device 602.

Upon receiving a networking request from a first workload, e.g., workload 612a, executing in a first container, e.g., container 606a, directed to a second workload, e.g., workload 612d, executing in a second container, e.g., container 606d, that is co-resident on the edge device, the networking forwarder can intercept the networking request at the socket layer, determine the socket address of the second workload, and route the request to the second workload by way of the socket address. In some embodiments, the networking forwarder 140 consults an access list 614 to determine if forwarding the networking request to the second workload, e.g., 612d, executing in the second container, e.g., container 606d, is permitted. In some embodiments, if a rule or policy does not exist in access list 614 that explicitly allows the network forwarder 140 to forward a networking request from a first workflow to a second workflow, the network forwarding request is denied. In some embodiments, the absence of a rule or policy in access list 614 that explicitly prohibits the network forwarder 140 from forwarding a networking request from a first workflow to a second workflow, allows the network forwarding request to be forwarded to the second workflow. In some embodiments, the networking forwarder 140 may utilize other criteria to determine the destination socket for the second workload. It should be noted that execution environment 604, containers 606a-d, virtual machine 608, and workloads 612a-d are shown for illustrative purposes only and are not physical components of edge device 602.

Figure 7:
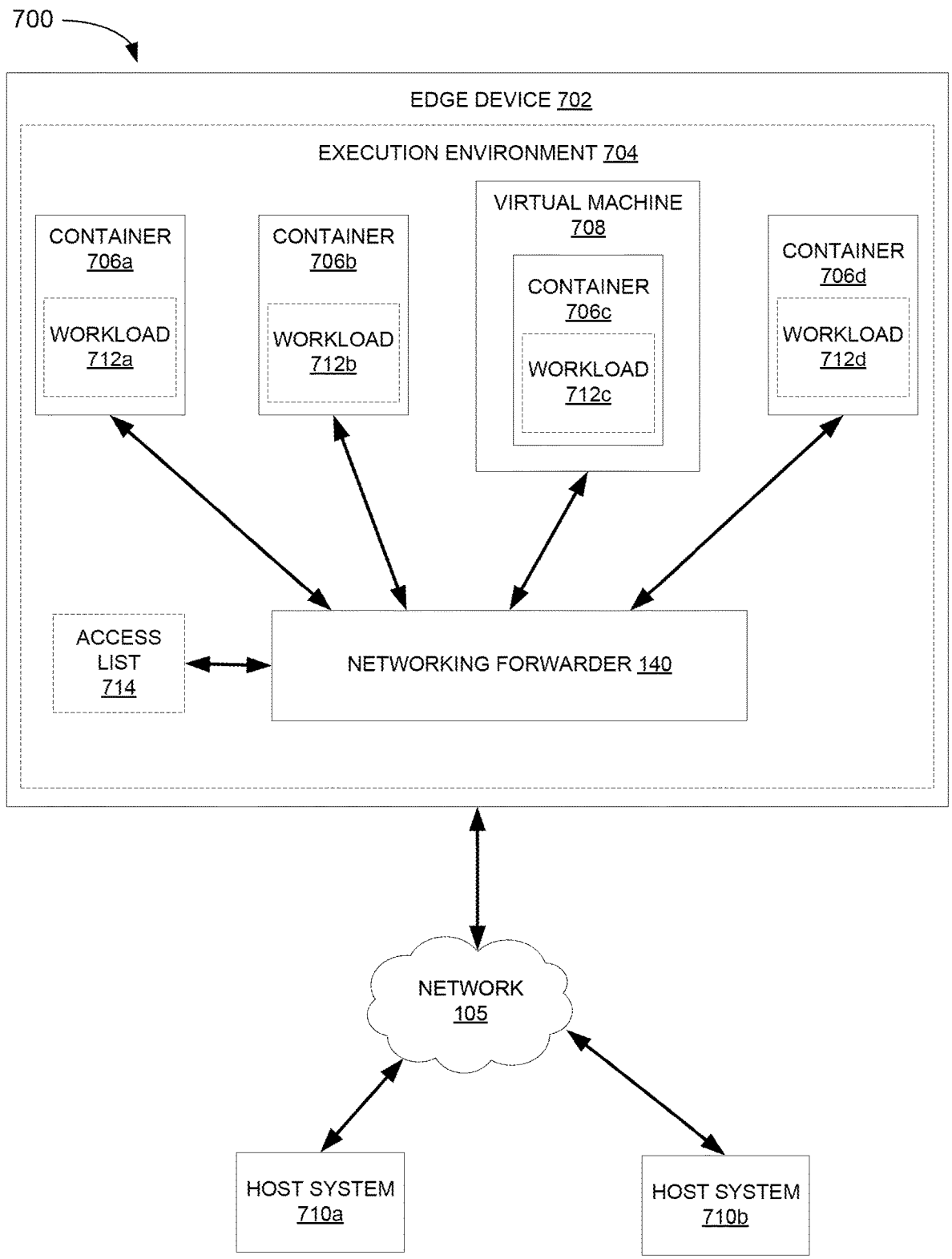
FIG. 7 is an illustration of an example execution environment within an edge device, with a first container transmitting a networking request to another workload within a second container, in accordance with some embodiments of the disclosure.

FIG. 7 is an illustration of an example execution environment 700 within an edge device 702, with a first container transmitting a networking request to another workload within a second container, in accordance with some embodiments of the disclosure. In the example, the networking forwarder 140 uses an access list 714 to deny forwarding. Networking forwarder architecture 700 may correspond to networking forwarder architecture 100, as previously described at FIG. 1. For clarity, some elements of the networking forwarder architecture 100 are not shown.

Referring to FIG. 7, containers 706a-d include workloads 712a-d, respectively, that are to be executed by execution environment 704 of edge device 702 of the network forwarder architecture 700. Container 706c executes within a virtual machine 708. Upon detection of a networking request from a workload 712a executing within container 706a, networking forwarder inspects the destination address of the networking request. If the container is co-resident on the edge device 702, it can be directly routed to the socket associated with the destination address and bypass the lower TCP/IP layers. If the destination address is external to the edge device, programming logic of the network forwarder 140 can cause the networking request to use the regular TCP/IP network stack. It should be noted that containers 706a-d, workloads 712a-d, virtual machine 708, execution environment 704, and networking forwarder 140 are shown for illustrative purposes only and are not physical components of edge device 702.

Upon receiving a networking request from a first workload, e.g., workload 712a, executing in a first container, e.g., container 706a, directed to a second workload, e.g., workload 712d, executing in a second container, e.g., container 706d, that is co-resident on the edge device, the networking forwarder can intercept the networking request at the socket layer, determine the socket address of the second workload, and route the request to the second workload by way of the socket address. In some embodiments, the networking forwarder 140 consults an access list 714 to determine if forwarding the networking request to the second workload, e.g., 712d, executing in the second container, e.g., container 706d, is permitted. In some embodiments, if a rule or policy does not exist in access list 714 that explicitly disallows the network forwarder 140 from forwarding a networking request from a first workflow to a second workflow, the network forwarding request is allowed. In some embodiments, the absence of a rule or policy in access list 714 that explicitly allows the network forwarder 140 to forward a networking request from a first workflow to a second workflow, disallows the network forwarder 140 from forwarding the network forwarding request to the second workflow. In some embodiments, the networking forwarder 140 may utilize other criteria to determine the destination socket for the second workload. It should be noted that execution environment 704, containers 706a-d, virtual machine 708, and workloads 712a-d are shown for illustrative purposes only and are not physical components of edge device 702.

Figure 8:
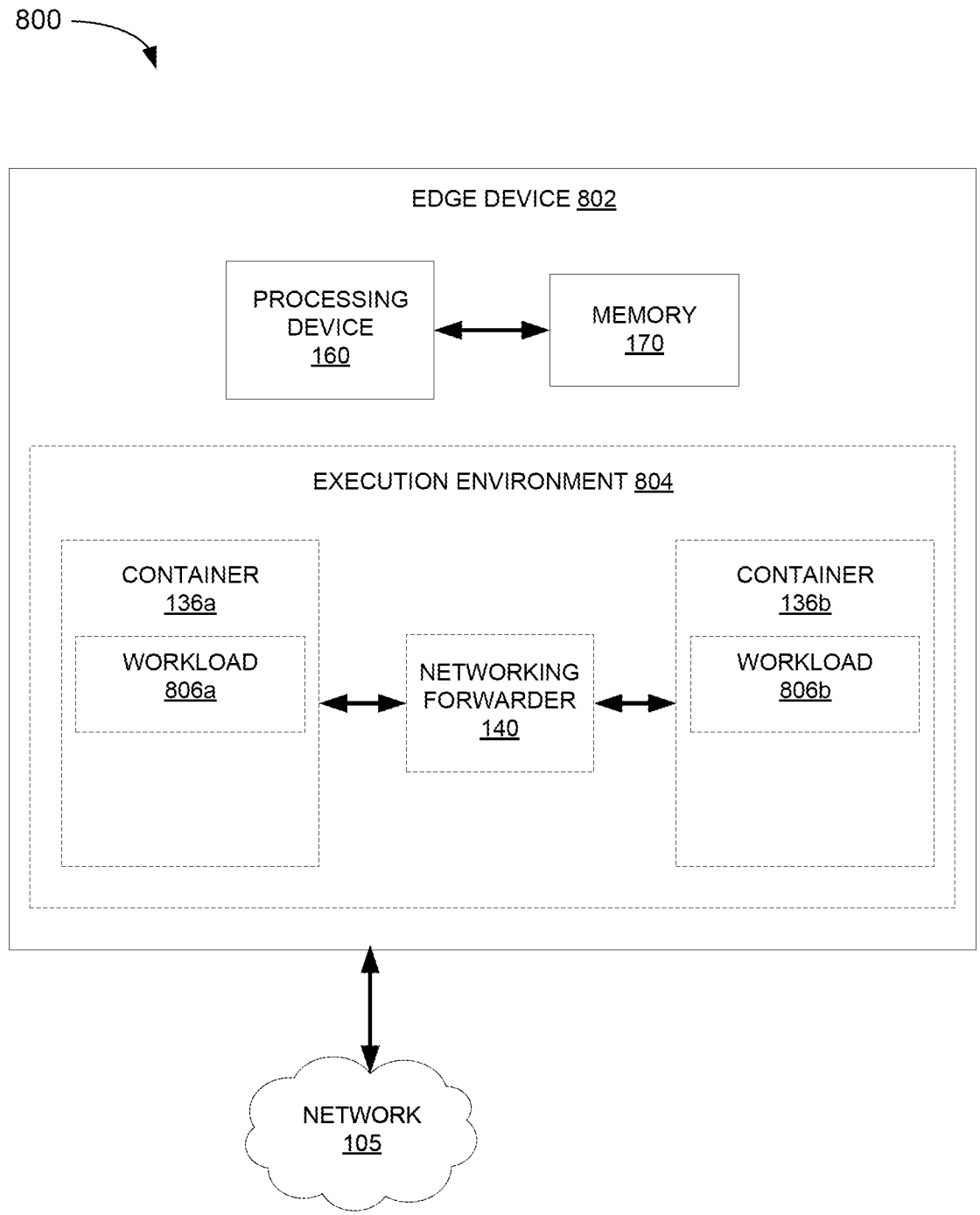
FIG. 8 is a block diagram depicting an example networking forwarder architecture, in accordance with embodiments of the disclosure.

FIG. 8 is a block diagram depicting an example networking forwarder architecture 800, in accordance with embodiments of the disclosure. The networking forwarder architecture 800 includes edge device 802. Edge device 802, which may correspond to edge device 202 of FIG. 2, includes processing device 160 and memory 170. Edge device 802, of networking forwarder architecture 800, also includes execution environment 804. Execution environment 804, which may correspond to execution environment 130 of FIG. 1, includes containers 136a and 136b, workloads 806a and 806b, and networking forwarder 140. Networking forwarder 140 may correspond to networking forwarder 140 of FIG. 1. It should be noted that execution environment 804, containers 136a and 136b, workloads 806a and 806b, and networking forwarder 140 are shown for illustrative purposes only and are not physical components of edge device 802.

Edge device 802 may support execution environment 802. As previously described, execution environment 804 may include VMs, containers, or one or more containers within a VM. Although illustrated as each having one execution environment, in some embodiments edge device 802 may include any number of execution environments. Edge device 802 may include a memory 170 that is operatively coupled to processing device 160. In some embodiments, memory 170 may include volatile memory devices, e.g., random access memory (RAM), non-volatile memory devices, e.g., flash memory, and/or other types of memory devices. Edge device 802 and networking forwarder 140 may be communicatively coupled via network 105. In some embodiments, network 105 may be similar to network 105 of FIG. 1.

The processing device 160 of edge device 802 receives a networking request from workload 806a running in container 136a. In some embodiments, a workload can be an application. Networking forwarder 140 determines that a destination of the networking request is workload 806b executing in container 136b. The networking forwarder 140 forwards the networking request to the second workload 806b.

Figure 9:
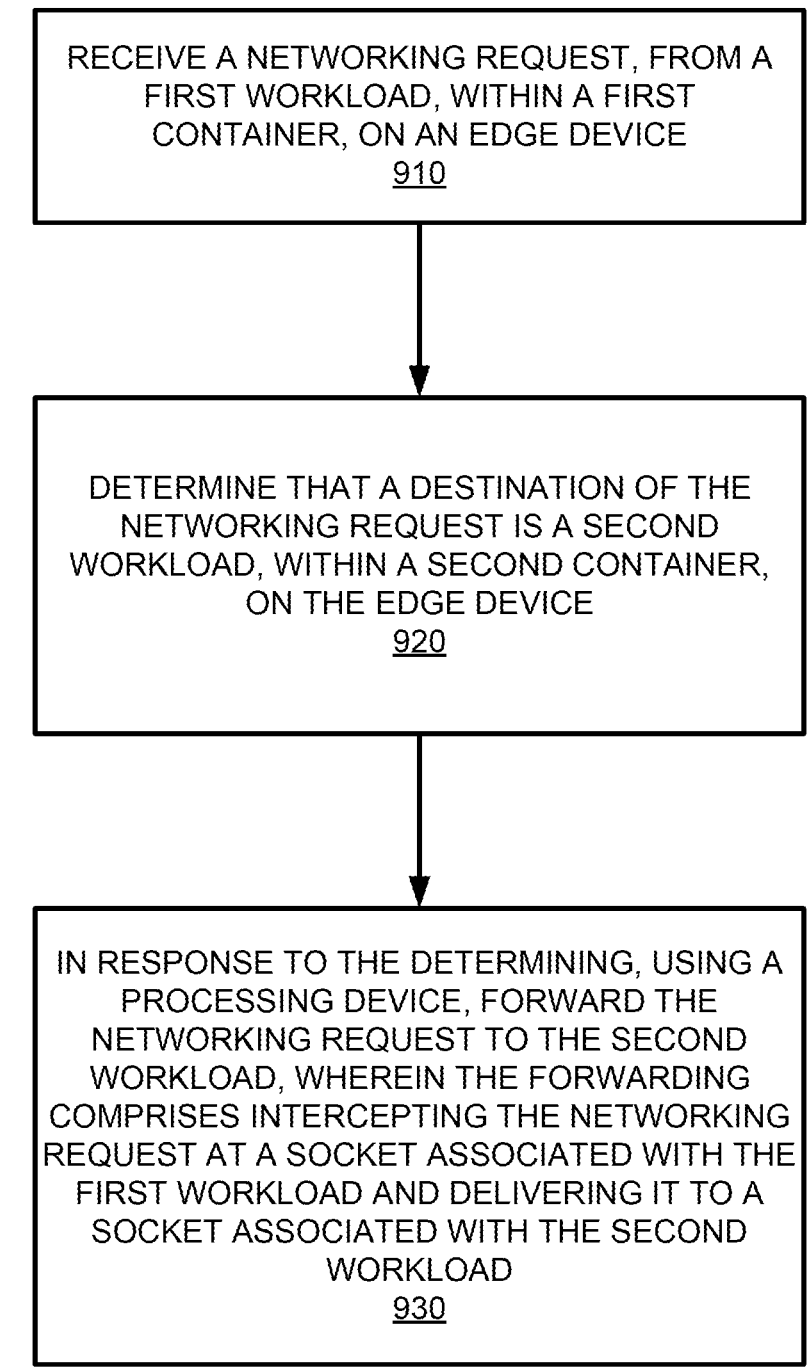
FIG. 9 is a flow diagram of a method of forwarding a network request, in accordance with some embodiments.

FIG. 9 is a flow diagram of a method 900 of forwarding a network request, in accordance with some embodiments, in accordance with some embodiments. Method 900 may be performed by processing logic that may comprise hardware, e.g., circuitry, dedicated logic, programmable logic, a processor, a processing device, a central processing unit (CPU), a system-on-a-chip (SoC), software, e.g., instructions running/executing on a processing device, firmware, e.g., microcode, or a combination thereof. In some embodiments, at least a portion of method 900 may be performed by networking forwarder 140 of FIG. 1.

With reference to FIG. 9, method 900 illustrates example functions used by various embodiments. Although specific function blocks ("blocks") are disclosed in method 900, such blocks are examples. That is, some embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives a networking request from a first workload, within a first container, on an edge device. In some embodiments, this networking request will initiate from a workflow executing in a container on an edge device. In some embodiments, this networking request includes an address of another host, execution environment, and/or container, and an address of an application resident on that host, execution environment, and/or container. In some embodiments, the networking request is received using a hook. In some embodiments, the hook is an operating system hook. In some embodiments, the hook is a sandboxed hook.

At block 920, the processing logic determines that a destination of the networking request is a second workload, within a second container, on the edge device. In some embodiments, the destination of the networking request is a workflow executing on another container within the edge device. In some embodiments, the destination of the networking request is a workflow executing on another host, or in another execution environment or container. In some embodiments, the processing logic determines whether the destination of the network request is a workflow executing in another container within the edge device. In some embodiments, to determine the destination of the networking request, the processing logic queries a map. In some embodiments, the map is created during orchestration of the first container and the second container on the edge device. In some embodiments, the map comprises a set of entries, an entry comprising a network address, a socket, and a workflow.

At block 930, in response to the determining, using a processing device, the processing logic forwards the networking request to the second workload, wherein the forwarding comprises intercepting the networking request at a socket associated with the first workload and delivering it to a socket associated with the second workload. If the destination lies outside the edge device, the processing logic will use the default TCP/IP stack to deliver the networking request. In some embodiments, the first container and the second container reside within one or more execution environments.

Figure 10:
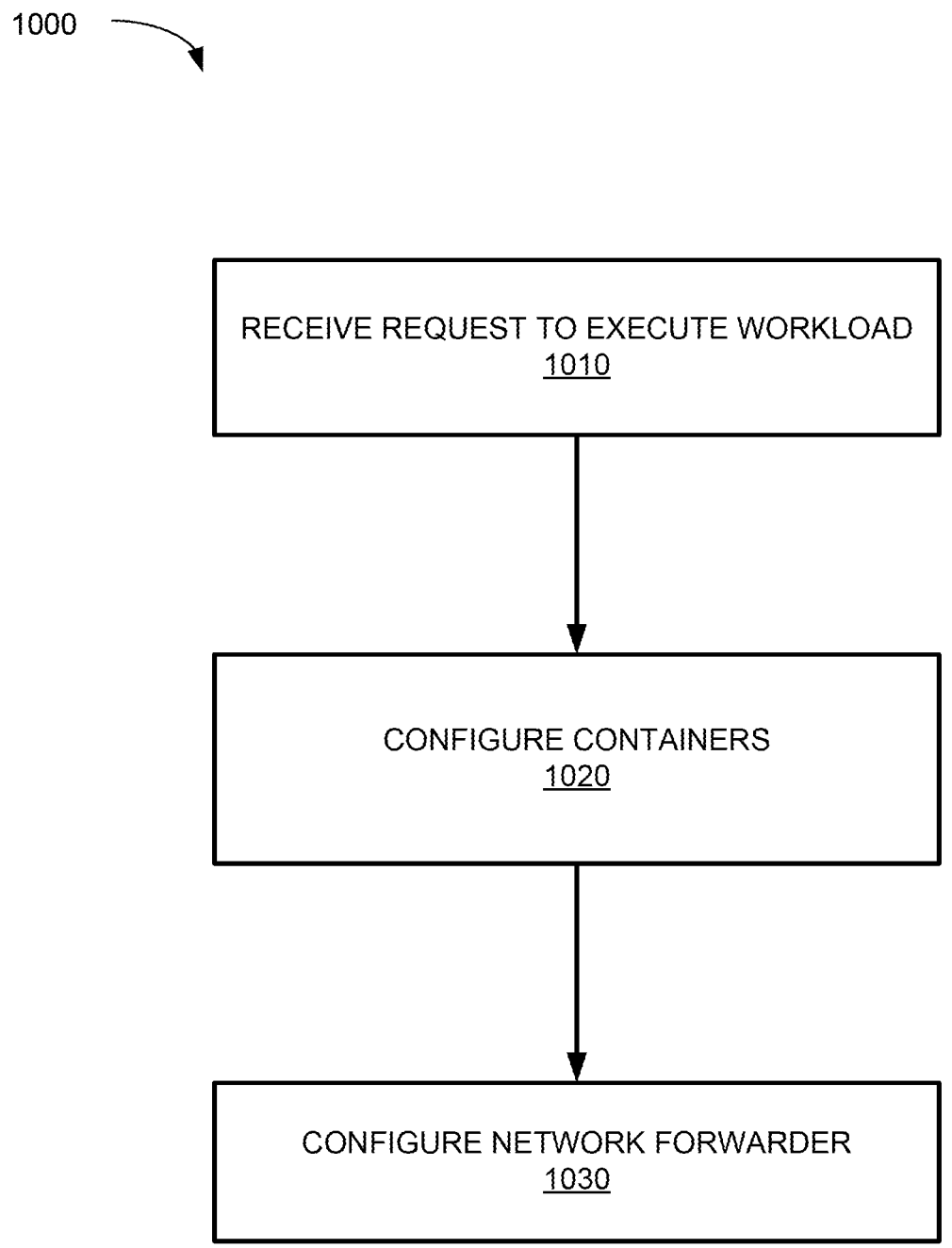
FIG. 10 is a flow diagram of a method of deploying a workload comprising a network forwarder, in accordance with some embodiments.

FIG. 10 is a flow diagram of a method 1000 of deploying a workload comprising a network forwarder, in accordance with some embodiments, in accordance with some embodiments. Method 1000 may be performed by processing logic that may comprise hardware, e.g., circuitry, dedicated logic, programmable logic, a processor, a processing device, a central processing unit (CPU), a system-on-a-chip (SoC), software, e.g., instructions running/executing on a processing device, firmware, e.g., microcode, or a combination thereof. In some embodiments, at least a portion of method 1000 may be performed by networking forwarder 140 of FIG. 1.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic receives, from a client device, a request to execute a workload. The request may include identification information associated with one or more containers to be created within an execution environment on an edge device of a networking forwarder architecture.

At block 1020, the processing logic configures the one or more containers. As part of the configuring, socket addresses for one or more workflows on the one or more containers may be determined.

At block 1030, the processing logic configures a networking forwarder. In some embodiments, some functions of the networking forwarder may be performed by networking forwarder 140 of FIG. 1. The processing logic may configure socket connections between the one or more workflows executing on the one or more containers within the execution environment on the edge device, as previously described.

FIG. 11 is a flow diagram of a method 1100 of forwarding a network request, in accordance with some embodiments, in accordance with some embodiments. Method 1100 may be performed by processing logic that may comprise hardware, e.g., circuitry, dedicated logic, programmable logic, a processor, a processing device, a central processing unit (CPU), a system-on-chip (SoC), software, e.g., instructions running/executing on a processing device, firmware, e.g., microcode, or a combination thereof. In some embodiments, at least a portion of method 1100 may be performed by networking forwarder 140 of FIG. 1.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

Method 1100 begins at block 1110, where the processing logic receives a networking request, from a first workload, within a first container, on an edge device. In some embodiments, this networking request will initiate from a workflow executing in a container on an edge device. In some embodiments, this networking request includes an address of another host, execution environment, and/or container, and an address of an application resident on that host, execution environment, and/or container.

At block 1120, the processing logic determines that a destination of the networking request is a second workload, within a second container, on the edge device. In some embodiments, the destination of the networking request is a workflow executing on another container within the edge device. In some embodiments, the destination of the networking request is a workflow executing on another host, or in another execution environment or container. In some embodiments, the processing logic determines whether the destination of the network request is a workflow executing in another container within the edge device.

At block 1130, the processing logic, in response to the determining, evaluates the networking request against an access list, and on a condition that the destination of the networking request is permitted by the access list, forwards the networking request to the second workload, wherein the forwarding comprises intercepting the networking request at a socket associated with the first workload and delivering it to a socket associated with the second workload. In some embodiments, if the destination of the network request appears on the access list as a permitted destination and is a workflow executing in another container within the edge device, the processing logic will intercept the networking request at the socket interface and deliver the networking request to the socket of the destination workflow. In some embodiments, if the destination of the network request is absent from the access list, the networking request will be allowed. In some embodiments, if the destination of the network request is absent from the access list, the networking request will be denied. In some embodiments, if the destination of the network request is present in the access list, but without an explicit "allow" directive, the networking request will be denied. In some embodiments, if the destination lies outside the edge device, the processing logic will use the default TCP/IP stack to deliver the networking request. In some embodiments, the access list may provide access control for destinations external to the edge device.

FIG. 12 is a flow diagram of a method 1200 of forwarding a network request, in accordance with some embodiments. Method 1200 may be performed by processing logic that may comprise hardware, e.g., circuitry, dedicated logic, programmable logic, a processor, a processing device, a central processing unit (CPU), or a system-on-chip (SoC), software, e.g., instructions running/executing on a processing device, firmware, e.g., microcode, or a combination thereof. In some embodiments, at least a portion of method 1200 may be performed by networking forwarder 140 of FIG. 1.

With reference to FIG. 12, method 1200 illustrates example functions used by various embodiments. Although specific function blocks ("blocks") are disclosed in method 1200, such blocks are examples. That is, embodiments are well suited to performing various other blocks or variations of the blocks recited in method 1200. It is appreciated that the blocks in method 1200 may be performed in an order different than presented, and that not all of the blocks in method 1200 may be performed.

Method 1200 begins at block 1210, where the processing logic receives a networking request, from a first workload, within a first container, on an edge device. In some embodiments, this networking request will initiate from a workflow executing in a container on an edge device. In some embodiments, this networking request includes an address of another host, execution environment, and/or container, and an address of an application resident on that host, execution environment, and/or container.

At block 1220, the processing logic determines that a destination of the networking request is a second workload, within a second container, on the edge device. In some embodiments, the destination of the networking request is a workflow executing on another container within the edge device. In some embodiments, the destination of the networking request is a workflow executing on another host, or in another execution environment or container. In some embodiments, the processing logic determines whether the destination of the network request is a workflow executing in another container within the edge device.

At block 1230, if the destination of the network request appears on the access list as a denied destination and is a workflow executing in another container within the edge device, the processing logic will intercept the networking request at the socket interface and reject the networking request to the socket of the destination workflow. In some embodiments, the access list may provide access control for destinations external to the edge device.

At block 1230, the processing logic, in response to the determining, evaluates the networking request against an access list and on a condition that the destination of the networking request is denied by the access list, the processing logic rejects the networking request. In some embodiments, if the destination of the network request appears on the access list as a denied destination and is a workflow executing in another container within the edge device, the processing logic will reject the networking request. In some embodiments, if the destination of the network request is absent from the access list, the processing logic will reject the networking request. In some embodiments, if the destination of the network request is absent from the access list, the networking request will be allowed. In some embodiments, if the destination of the network request is present in the access list, but with an explicit "deny" directive, the networking request will be denied. In some embodiments, if the destination lies outside the edge device, the processing logic will use the default TCP/IP stack to deliver the networking request. In some embodiments, the access list may provide access control for destinations external to the edge device.

Figure 13:
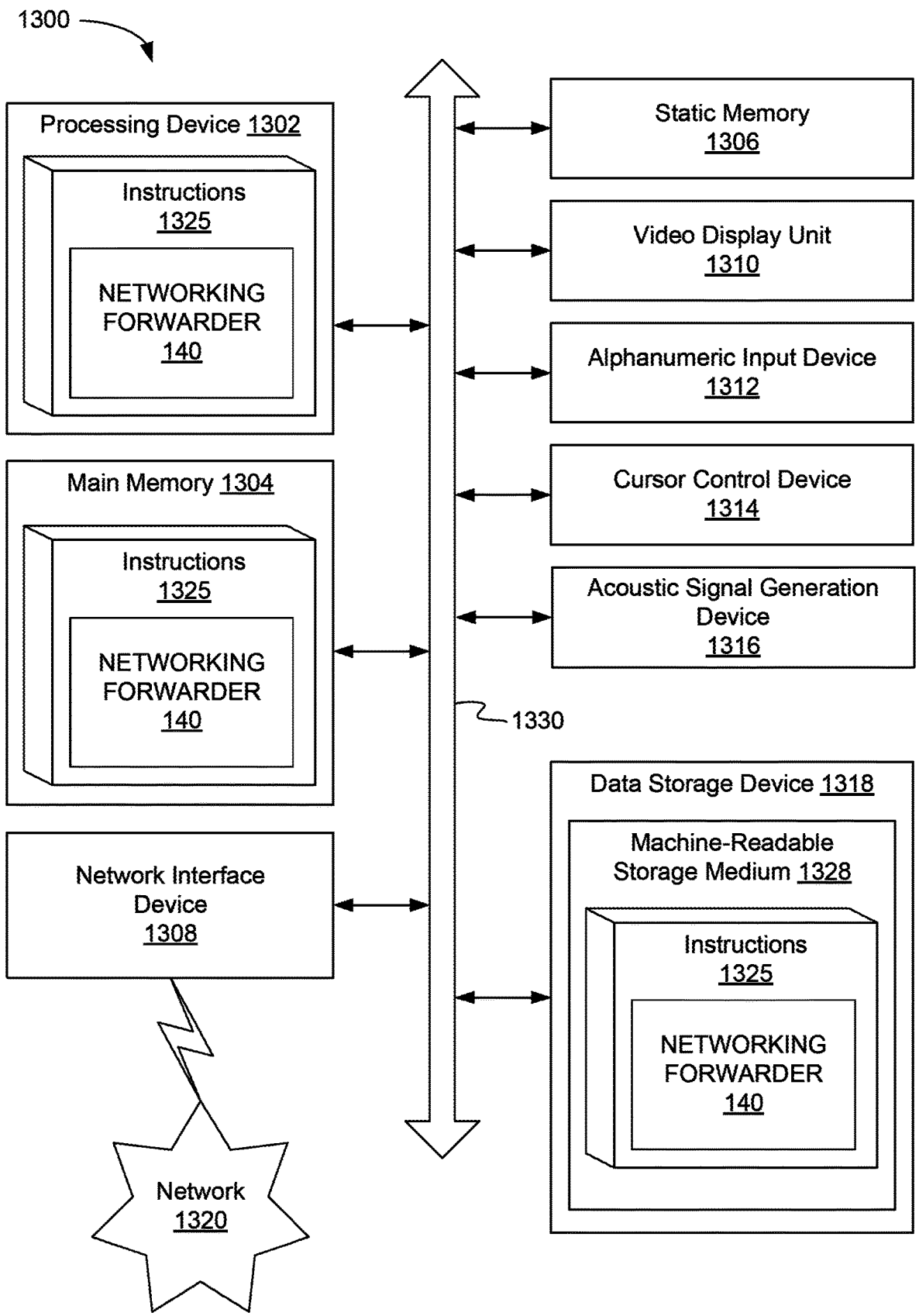
FIG. 13 is a Hock diagram of an example computing device that may perform one or more of the operations described herein, in accordance with some embodiments of the present disclosure.

FIG. 13 is a block diagram of an example computing device 1300 that may perform one or more of the operations described herein, in accordance with some embodiments. Computing device 1300 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, a switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1300 may include a processing device 1302, e.g., a general-purpose processor or a programmable logic device (PLD), a main memory 1304, e.g., a synchronous dynamic random-access memory (DRAM) or a read-only memory (ROM), a static memory 1306, e.g., flash memory, and a data storage device 1318, which may communicate with each other via a bus 1330.

Processing device 1302 may be provided by one or more general-purpose processing devices such as a microprocessor, central processing unit, or the like. In an illustrative example, processing device 1302 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1302 may also include one or more special-purpose processing devices such as an application specific integrated circuit (ASIC), a field programmable gate array (FPGA), a digital signal processor (DSP), a network processor, or the like. The processing device 1302 may be configured to execute the operations described herein, in accordance with one or more aspects of the present disclosure, for performing the operations and steps discussed herein.

Computing device 1300 may further include a network interface device 1308 which may communicate with a network 1320. The computing device 1300 also may include a video display unit 1310, e.g., a liquid crystal display (LCD) or a cathode ray tube (CRT), an alphanumeric input device 1312, e.g., a keyboard, a cursor control device 1314, e.g., a mouse, and an acoustic signal generation device 1316, e.g., a speaker. In one embodiment, video display unit 710, alphanumeric input device 1312, and cursor control device 1314 may be combined into a single component or device, e.g., an LCD touch screen.

Data storage device 1318 may include a computer-readable storage medium 1328 on which may be stored one or more sets of instructions 1325 that may include instructions for a network forwarder system 140 for carrying out the operations described herein, in accordance with one or more aspects of the present disclosure. Instructions 1325 may also reside, completely or at least partially, within main memory 1304 and/or within processing device 1302 during execution thereof by computing device 1300, main memory 1304 and processing device 1302 also constituting computer-readable media. The instructions 1325 may further be transmitted or received over a network 1320 via network interface device 1308.

While computer-readable storage medium 1328 is shown in an illustrative example to be a single medium, the term "computer-readable storage medium" should be taken to include a single medium or multiple media, e.g., a centralized or distributed database and/or associated caches and servers, that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, and magnetic media.

Example 1 is a method comprising: receiving a networking request, from a first workload, within a first container, on an edge device; determining that a destination of the networking request is a second workload, within a second container, on the edge device; and in response to the determining, using a processing device, forwarding the networking request to the second workload, wherein the forwarding comprises: intercepting the networking request at a socket associated with the first workload and; delivering it to a socket associated with the second workload.

Example 2 is the method of Example 1, wherein the networking request comprises a networking system call.

Example 3 is the method of Example 2, wherein the networking system call comprises a payload.

Example 4 is the method of Example 3, wherein forwarding the networking request comprises forwarding the payload.

Example 5 is the method of any of Examples 1-4, wherein determining the destination of the networking request comprises querying a map.

Example 6 is the method of Example 5, wherein the map is created during orchestration of the first container and the second container on the edge device.

Example 7 is the method of any of Examples 1-6, wherein intercepting the network request comprises obtaining a payload of the network request prior to encapsulating the payload within a TCP/IP packet.

Example 8 is the method of any of Examples 1-7, wherein intercepting the network request comprises executing an extended Berkeley packet filter.

Example 9 is a system comprising: a memory; and a processing device, operatively coupled to the memory, to: receive a networking request, from a first workload, within a first container, on an edge device; determine that a destination of the networking request is a second workload, within a second container, on the edge device; and in response to the determining, forward the networking request to the second workload, wherein to forward comprises: intercept the networking request at a socket associated with the first workload and; deliver the networking request to a socket associated with the second workload.

Example 10 is the system of Example 9, wherein to intercept the network request is to execute an extended Berkeley packet filter.

Example 11 is the system of any of Examples 9-10, wherein the networking request is received using a hook.

Example 12 is the system of Example 11, wherein the hook is an operating system hook.

Example 13 is the system of Example 11, wherein the hook is a sandboxed hook.

Example 14 is the system of any of Examples 9-13, wherein, to determine the destination of the networking request is to query a map.

Example 15 is the system of Example 14, wherein the map is created during orchestration of the first container and the second container on the edge device.

Example 16 is the system of Example 15, wherein the map comprises a set of entries, an entry comprising: a network address; a socket; and an application.

Example 17 is the system of any of Examples 9-16, wherein the first container and the second container reside within one or more execution environments.

Example 18 is a non-transitory computer-readable storage medium including instructions that, when executed by a processing device, cause the processing device to: receive a networking request, from a first workload, within a first container, on an edge device; determine that a destination of the networking request is a second workload, within a second container, on the edge device; and in response to the determining, forward the networking request, by the processing device, to the second workload, wherein to forward comprises: intercept the networking request at a socket associated with the first workload and; deliver the networking request to a socket associated with the second workload.

Example 19 is the non-transitory computer-readable storage medium of Example 18, wherein, to determine the destination of the networking request, the processing device is to query a map.

Example 20 is the non-transitory computer-readable storage medium of any of Examples 18-19, wherein to intercept the network request, the processor is to execute an extended Berkeley packet filter.

Example 21 is the non-transitory computer-readable storage medium of any of Examples 18-20, wherein the networking request comprises a networking system call.

Example 22 is the non-transitory computer-readable storage medium of Example 21, wherein the networking system call comprises a payload.

Example 23 is the non-transitory computer-readable storage medium of Example 22, wherein forwarding the networking request comprises forwarding the payload.

Example 24 is the non-transitory computer-readable storage medium of any of Examples 18-23, wherein receiving the networking request comprises intercepting the networking request at a socket layer.

Example 25 is a method comprising: receiving a networking request, from a first workload, within a first container, on an edge device; determining that a destination of the networking request is a second workload, within a second container, on the edge device, wherein the second container is different from the first container; in response to the determining, evaluate the networking request against an access list and on a condition that the destination of the networking request is permitted by the access list, forward the networking request to the second workload, wherein the forwarding comprises intercepting the networking request at a socket associated with the first workload and delivering it to a socket associated with the second workload.

Example 26 is the method of Example 25, wherein the networking request comprises a networking system call.

Example 27 is the method of any of Examples 25-26, wherein determining the destination of the networking request comprises querying a map.

Example 28 is the method of Example 27, wherein intercepting the network request comprises obtaining a payload of the network request prior to encapsulating the payload within a TCP/IP packet.

Example 29 is the method of any of Examples 25-28, wherein forwarding the networking request comprises sending the networking request to a socket associated with the second workload.

Example 30 is an apparatus comprising: means for receiving a networking request, from a first workload, within a first container, on an edge device; means for determining that a destination of the networking request is a second workload, within a second container, on the edge device; and means for, in response to the determining, forwarding the networking request to the second workload.

Example 31 is the apparatus of Example 30, wherein the networking request comprises a networking system call.

Example 32 is the apparatus of Example 31, wherein the networking system call comprises a payload.

Example 33 is the apparatus of Example 32, wherein means for forwarding the networking request comprises means for forwarding the payload.

Example 34 is the apparatus of any of Examples 30-33, wherein means for receiving the networking request comprises means for intercepting the networking request at a socket layer.

Example 35 is the apparatus of Example 34, wherein means for intercepting the network request comprises means for obtaining a payload of the network request prior to encapsulating the payload within a TCP/IP packet.

Example 36 is the apparatus of any of Examples 30-35, wherein means for forwarding the networking request comprises means for sending the networking request to a socket associated with the second workload.

Unless specifically stated otherwise, terms such as "receiving," "determining," "forwarding," "intercepting," "identifying," "sending," "querying," "creating," or the like, refer to actions and processes performed or implemented by computing devices that manipulate and transform data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

As used herein, the term "and/or" includes any and all combinations of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure, e.g., circuitry, that performs the task or tasks during operation. As such, the unit/circuit/component can be said to be configured to perform the task, or configurable to perform the task, even when the specified unit/circuit/component is not currently operational, e.g., is not on. The units/circuits/components used with the "configured to" or "configurable to" language include hardware, e.g., circuits and memory storing program instructions executable to implement the operation. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure, e.g., generic circuitry, that is manipulated by software and/or firmware, e.g., an FPGA or a general-purpose processor executing software, to operate in manner that is capable of performing the task(s) at issue. "Configured to" may also include adapting a manufacturing process, e.g., a semiconductor fabrication facility, to fabricate devices, e.g., integrated circuits, that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   receiving, from a first workload executing within a first container on an edge device, a request to send data to a second workload;
   determining that the second workload is executing within a second container on the edge device, wherein the first container and the second container are different; and
   in response to the determining:
      identifying, by a processing device and using a map, a first socket on the first container, wherein the first socket is associated with the first workload;
      identifying, by the processing device and using the map, a second socket on the second container, wherein the second socket is associated with the second workload; and
      routing, by the processing device, a set of data packets associated with the data from the first socket to the second socket,
      wherein the routing comprises:
         intercepting the request at a socket layer to determine a socket address of the second workload;
         routing the request according to socket address while bypassing one or more Transmission Control Protocol/Internet Protocol (TCP/IP) layers that are lower than the socket layer; and
         executing an extended Berkeley packet filter.

2. The method of claim 1, wherein the request comprises a networking system call.

3. The method of claim 2, wherein the networking system call comprises a payload.

4. The method of claim 1, wherein the request is intercepted at the socket layer using a hook.

5. The method of claim 1, wherein the map is created during orchestration of the first container and the second container on the edge device.

6. The method of claim 1, wherein routing the set of data packets from the first socket to the second socket comprises obtaining a payload of the data prior to encapsulating the payload within a TCP/IP packet.

7. A system comprising:
   a memory; and
   a processing device, operatively coupled to the memory, to:
      receive, from a first workload executing within a first container on an edge device, a request to send data to a second workload;
      determine that the second workload is executing within a second container on the edge device, wherein the first container and second container are different; and
      in response to the determining:
         identify, by a processing device and using a map, a first socket on the first container, wherein the first socket is associated with the first workload;
         identify, by the processing device and using the map, a second socket on the second container, wherein the second socket is associated with the second workload; and
         route, by the processing device, a set of data packets associated with the data from the first socket to the second socket,
         wherein, to route the set of data packets, the processing device is to:
            intercept the request at a socket layer to determine a socket address of the second workload;
            route the request according to socket address while bypassing one or more Transmission Control Protocol/Internet Protocol (TCP/IP) layers that are lower than the socket layer; and
            execute an extended Berkeley packet filter.

8. The system of claim 7, wherein the request is intercepted at the socket layer using a hook.

9. The system of claim 8, wherein the hook is an operating system hook.

10. The system of claim 8, wherein the hook is a sandboxed hook.

11. The system of claim 7, wherein the map is created during orchestration of the first container and the second container on the edge device.

12. The system of claim 7, wherein the map comprises a set of entries, an entry comprising:
   a network address;
   a socket; and
   a workflow.

13. The system of claim 7, wherein the first container and the second container reside within one or more execution environments.

14. A non-transitory computer-readable storage medium including instructions that, when executed by a processing device, cause the processing device to:
   receive, from a first workload executing within a first container on an edge device, a request to send data to a second workload;

determine that the second workload is executing within a second container on the edge device, wherein the first container and second container are different; and in response to the determining:
   identify, by a processing device and using a map, a first socket on the first container, wherein the first socket is associated with the first workload;
   identify, by the processing device and using the map, a second socket on the second container, wherein the second socket is associated with the second workload; and
   route, by the processing device, a set of data packets associated with the data,
   wherein, to route the set of data packets, the instructions cause the processing device to:
     intercept the request at a socket layer to determine a socket address of the second workload;
     route the request according to socket address while bypassing one or more Transmission Control Protocol/Internet Protocol (TCP/IP) layers that are lower than the socket layer; and
     execute an extended Berkeley packet filter.

\* \* \* \* \*